United States Patent [19]

Nose

[11] Patent Number: 4,539,482

[45] Date of Patent: Sep. 3, 1985

[54] READING APPARATUS

[75] Inventor: Noriyuki Nose, Yokohama, Japan

[73] Assignee: Canon Kabushiki Kaisha, Tokyo, Japan

[21] Appl. No.: 309,380

[22] Filed: Oct. 7, 1981

[30] Foreign Application Priority Data

| Oct. 9, 1980 | [JP] | Japan | 55-141188 |
| Nov. 17, 1980 | [JP] | Japan | 55-161547 |
| May 29, 1981 | [JP] | Japan | 56-82682 |
| Jun. 19, 1981 | [JP] | Japan | 56-94646 |
| Jun. 23, 1981 | [JP] | Japan | 56-97769 |
| Jun. 23, 1981 | [JP] | Japan | 56-97770 |
| Aug. 7, 1981 | [JP] | Japan | 56-124542 |
| Sep. 18, 1981 | [JP] | Japan | 56-148613 |
| Sep. 30, 1981 | [JP] | Japan | 56-155223 |

[51] Int. Cl.³ .............................................. H01J 40/14
[52] U.S. Cl. ................................. 250/578; 350/162.16
[58] Field of Search .............. 250/216, 552, 553, 556, 250/578; 350/162.16, 452; 358/212, 213

[56] References Cited

U.S. PATENT DOCUMENTS

| 3,569,997 | 3/1971 | Lehovec | 250/552 |
| 3,631,251 | 12/1971 | Lehovec | 250/552 |
| 3,649,837 | 3/1972 | Lehovec | 250/552 X |
| 4,270,047 | 5/1981 | Mochizuki et al. | 250/216 |

OTHER PUBLICATIONS

Donovan et al., Conference: Thirteeth IEEE Photovoltaic Specialists Conference—1978, Wash. D.C. (Jun. 5-8, 1978), pp. 1125-1130.

Primary Examiner—F. L. Evans
Attorney, Agent, or Firm—Fitzpatrick, Cella, Harper & Scinto

[57] ABSTRACT

An apparatus for dividing an original surface having image information into a plurality of areas and reading the image information with the use of a photosensor through a plurality of imaging systems provided correspondingly to said plurality of areas. The imaging systems for imaging the image information of the original surface on the photosensor include zone plates.

12 Claims, 65 Drawing Figures

READING APPARATUS

BACKGROUND OF THE INVENTION

1. Field of the Invention

This invention relates to an original reading apparatus of the type in which original image information to be read as a row of information is read by a plurality of imaging systems, and generally to a reading apparatus which is widely usable as a reading system such as facsimile or the like.

2. Description of the Prior Art

An original reading apparatus such as facsimile or the like has heretofore been of the type as shown in FIGS. 1 to 2 of the accompanying drawings. In FIG. 1, reference numeral 1 designates an original, reference numeral 2 denotes a fluorescent lamp for illuminating the original, reference numeral 3 designates a lens, and reference numeral 4 denotes a solid sensor such as CCD. The original 1 is illuminated by the fluorescent lamp 2, the image of the original is formed on the solid sensor 4 by the lens 3 and one line thereof is read, and the original is conveyed in the direction of arrow, whereby the information on the entire original surface is read successively. In such an apparatus, however, the angle of view of the lens 3 has an upper limit and therefore, the distance between the original 1 and the sensor 4 is unavoidably great, and this has led to a disadvantage that the apparatus becomes bulky even if a mirror or the like is used to bend back the optical path. Also, the quantity of light from the marginal portion of the original is reduced relative to the central portion of the original and a uniform output cannot be obtained, and this has led to the necessity of providing for various correcting means. A construction devised as a method for solving these problems is shown in FIG. 2. As shown in FIG. 2, the imaging optical system is constituted by an ommateal optical system comprising a plurality of juxtaposed lenses, and a plurality of solid state image pick-up elements corresponding to the respective lenses are disposed so that each of a plurality of areas into which one direction of the original has been divided is read by each lens and each solid state image pick-up element. The apparatus of FIG. 2 will further be described. In FIG. 2, reference numeral 5 designates an original, and reference numerals $6_1$, $6_2$ and $6_3$ denote parts of image information such as a picture or writing depicted on the original. Reference numerals $7_1$, $7_2$ and $7_3$ designate lenses, and reference numerals $8_1$, $8_2$ and $8_3$ denote the images of the parts $6_1$, $6_2$ and $6_3$, respectively, of the picture or writing on the original. Reference numerals $9_1$, $9_2$ and $9_3$ designate solid sensors, and reference numerals $10_1$-1, $10_1$-2, . . . , $10_1$-n, $10_2$-1, $10_2$-2, . . . , $10_2$-n, $10_3$-1, $10_3$-2, . . . , $10_3$-n denote the photoelectric converting portions of each 1 bit of the solid sensors $9_1$, $9_2$ and $9_3$. The operation of this reading apparatus is as follows. The original 5 is conveyed in a direction perpendicular to the plane of the drawing sheet, and the direction in which a number of lenses $7_1$, $7_2$, $7_3$, . . . and solid sensors $9_1$, $9_2$, $9_3$, . . . are arranged is the main scanning direction. The lenses $7_1$, $7_2$ and $7_3$ cause the reducedscale images $8_1$, $8_2$ and $8_3$ of the parts $6_1$, $6_2$ and $6_3$, respectively, of the picture or writing on the original to be formed on the solid sensors $9_1$, $9_2$ and $9_3$. The images $8_1$, $8_2$ and $8_3$ are inverted images and therefore, even if the outputs of the respective bits of the solid sensors $9_1$, $9_2$ and $9_3$ are arranged in the order of $10_1$-1, $10_1$-2, . . . , $10_1$-n, $10_2$-1, $10_2$-2, . . . , $10_2$-n, $10_3$-1, $10_3$-2, . . . , $10_3$-n from the end, it will not result in the right order of the parts of the picture or writing on the original. Accordingly, it is necessary to take out the outputs of the respective bits, for example, in the order of $10_1$-n . . . , $10_1$-2, $10_2$-1, $10_2$-n, . . . , $10_2$-2, $10_2$-1, $10_3$-n, . . . , $10_3$-2, $10_3$-1. Alternatively, it is necessary to take out the outputs in succession from the end and temporally store them in a memory and then take out them in the right order. Where the head of the recording system is a multihead, the correspondence between each bit of a solid sensor and each bit of a recording head portion corresponding to that solid sensor is taken in reversed relation, whereby signals read by the solid sensor are supplied to the recording system in succession from the end or in parallel and right recording is effected there. That is, each bit of the portion of the recording head which corresponds to the picture or writing $6_1$ on the original is just related to each bit of the solid sensor in the same geometrical relation with the portion $6_1$ of the original and the image $8_1$ thereof. This also holds true of the relation between the solid sensors $9_2$, $9_3$ and corresponding recording head portions.

The respective solid sensors must read only the image information of a predetermined area of the original, and to avoid reading the information of the other area at the same time, there are provided light-intercepting means $11_1$, $11_2$, $11_3$, $11_4$, . . . For example, the light beam from $6_3$ which is a part of the image is intercepted by the light-intercepting means $11_2$ and accordingly, the photoelectric conversion output of the solid sensor $9_1$ becomes a right signal which has read only the part $6_1$ of the picture or writing on the original. As regards the length of each solid sensor, in order that reading may be effected at a high resolving power, the length of the photoelectric converting portion row should desirably be equal to the length of each partial image (e.g., $6_1$), that is, the lenses $7_1$, $7_2$, $7_3$, . . . should desirably be one-to-one magnification systems, but in the construction of each solid sensor itself, a non-conversion area or light-intercepting means is provided outside of the photoelectric converting portion and therefore, each lens generally is not a one-to-one magnification system but a reduction imaging system. The positional accuracy of the imaging system comprising a plurality of lens systems as shown in FIG. 2 will now be considered. When the imaging lens (e.g., $7_1$) has made parallel eccentricity by $\Delta$ in the direction perpendicular to the optical axis, if the imaging magnification of the lens is $\beta$, the amount of movement $\delta$ of the visual field on the original surface having an imaging relation with a particular solid sensor, in the direction perpendicular to the optical axis, is in the following relation:

$$\delta = \Delta \left(1 - \frac{1}{\beta}\right) \tag{1}$$

where when $\beta > 0$, the resultant image is an erect image and when $\beta < 0$, the resultant image is an inverted image.

The fact that the visual field on the original surface having an imaging relation with a particular solid sensor moves in the direction perpendicular to the optical axis leads to a result that the correspondence relation between the images obtained by means of the solid sensors $9_1$, $9_2$, $9_3$, . . . and the original shifts and the finally obtained images suffer from skips or overlaps in the seams between the solid sensors $9_1, 9_2, 9_3, \ldots$ It is therefore desired that the amount of movement $\delta$ of the visual field on the original surface be made less than a certain predetermined amount determined for the size of 1 bit of the solid sensor.

For example, assuming that the size on the original surface which corresponds to the size of 1 bit of the solid sensor is $83.3\mu \times 1/\beta$, in order that the amount of movement $\delta$ of the visual field on the original surface may be made less than the size on the original surface corresponding to less than $\frac{1}{4}$ of 1 bit, namely, 20.8 $\mu \times 1/\beta$, if the imaging magnification $\beta = -0.8$ (inverted reduction imaging of $\times 0.8$), the amount of movement $\delta$ must be $\delta = \Delta(1 + 1/0.8) \leq 26.0$, that is, the amount of parallel eccentricity $\Delta$ of the imaging lens (e.g., $7_1$) in the direction perpendicular to the optical axis must be $11.55\mu$ or less. Likewise, assuming that the size on the original surface which corresponds to the size of 1 bit of the solid sensor is $125\mu \times 1/\beta$, in order that the amount of movement $\delta$ of the visual field on the original surface may be made less than the size on the original surface corresponding to less than $\frac{1}{4}$ of 1 bit, namely, $31.25\mu \times 1/\beta$, if the imaging magnification is inverted reduction imaging of $\times 0.8$, the amount of movement $\delta$ must be $\delta = \Delta(1 + 1/0.8) \leq 39.06\mu$, that is, the amount of parallel eccentricity $\Delta$ of the lens must be $17.4\mu$ or less. As will be seen from the foregoing, in order to obtain accurate image information which is free of skips or overlaps in the image of the original relative to the size of the bit at a practical level, the amount of parallel eccentricity $\Delta$ of each lens of the plurality of lens systems in the direction perpendicular to the optical axis must be reduced to $10\mu$–$20\mu$ or less. However, where the imaging lenses $7_1, 7_2, 7_3, \ldots$ are made of a material such as glass which is comparatively stable for temperature and humidity, individual lenses must be separately fabricated and then incorporated, and effecting the position adjustment with respect to the solid sensors $9_1, 9_2, 9_3, \ldots$ at high accuracy of $10\mu$–$20\mu$ during the incorporation requires much trouble because of the great number of lenses and this forms a factor which impedes mass productivity. Also, if the imaging lenses $7_1, 7_2, 7_3, \ldots$ are molded with a plastic such as acryl and the plural lenses are unitized thereby, the trouble involved in the position adjrustment with respect to the solid sensors $9_1, 9_2, 9_3, \ldots$ during the incorporation will be greatly reduced, whereas a moldable optical plastic such as acryl is greatly variable in dimensions or refractive index for environmental conditions such as temperature and humidity and therefore, it is difficult to reduce the previously shown parallel eccentricity accuracy to $10\mu$–$20\mu$ or less. For example, as regards the expansion by heat of acryl, its coefficient of thermal linear expansion is $\sim 6 \times 10^{-5}$ cm/cm/° C. and therefore, assuming that the amount of temperature variation is 40° (e.g., 20° C. $\pm$20° C.), the amount of linear expansion of acryl having a length of 200 mm is 480 $\mu$m. In contrast, the coefficient of thermal linear expansion of silicon (Si) or glass ($SiO_2$) which provides the substrate for solid sensors is lower by about one unit than that of acryl and therefore, the amount of linear expansion thereof is several $+\mu$m under the same conditions as those for acryl, and where ommateal lenses are unitized by the use of acryl, the amount of parallel eccentricity of the lenses with respect to the sensors will be a maximum of several hundred $\mu$m and it will be difficult to put acryl into practical use.

SUMMARY OF THE INVENTION

It is an object of the present invention to provide a reading apparatus which satisfies severe position adjustment accuracy of sensors and imaging systems.

It is a further object of the present invention to provide a reading apparatus which satisfies mass productivity and which is compact in construction.

It is still a further object of the present invention to provide a reading apparatus which is high in S/N ratio and excellent in reading accuracy.

It is yet still a further object of the present invention to provide a reading apparatus which has a small number of parts and permits manpower saving during assembly.

It is a further object of the present invention to provide a reading apparatus which is capable of color reading.

It is a further object of the present invention to provide an adjusting method which can strictly adjust the alignment between imaging systems and sensors.

The reading apparatus according to the present invention intends to achieve the above objects by using zone plates as the imaging optical system for imaging the image information on sensors. That is, in a reading apparatus wherein an original surface whose image information is to be read is divided into a plurality of areas and the image information of each of the areas is read by a sensor, zone plates are disposed correspondingly to said areas of the original surface so that the information of the divided original surface is imaged on the sensor by the zone plates, whereby the information of the original surface is read.

Although the present invention will hereinafter be described with reference to the accompanying drawings by the use of Fresnel type zone plates, the present invention may of course use Gabore type zone plates.

How the above-noted objects of the present invention are achieved will become apparent from the following detailed description taken in conjunction with the accompanying drawings.

DESCRIPTION OF THE PREFERRED EMBODIMENTS

Figure 1:
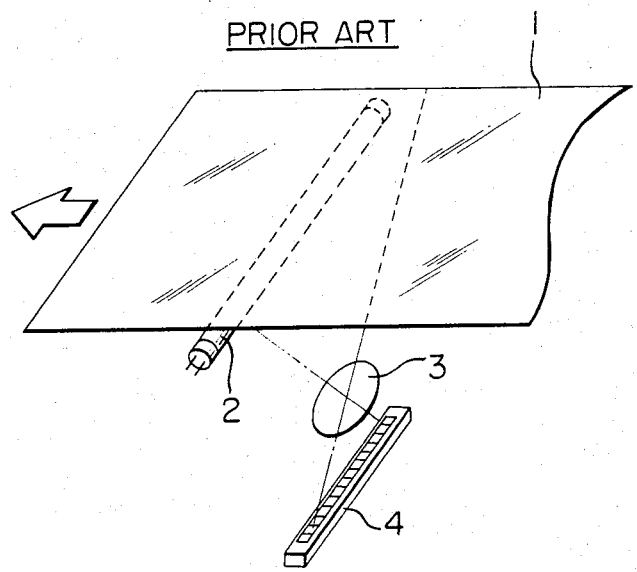
FIGS. 1 and 2 illustrate the original reading apparatus according to the prior art.
Figure 2:
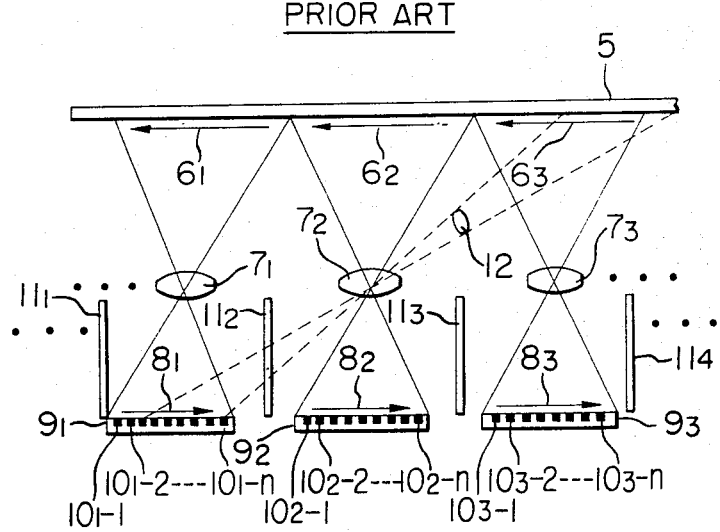
Figure 3:
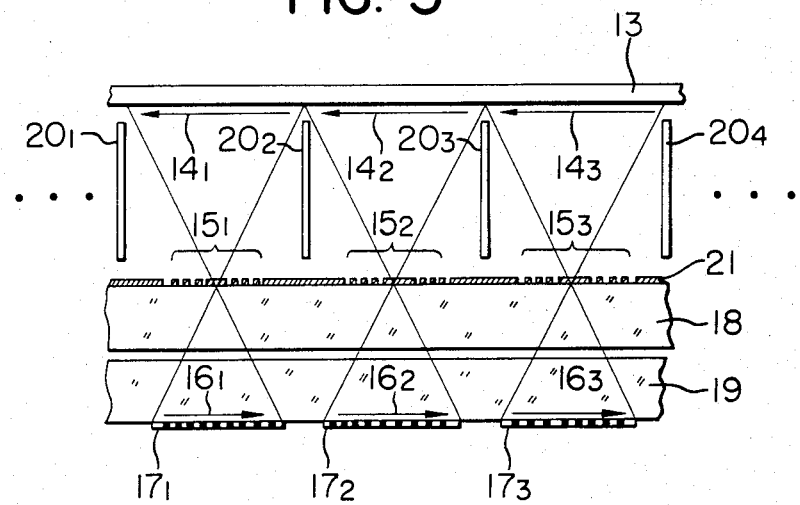
FIG. 3 shows an embodiment of the reading apparatus according to the present invention.

The construction of the present invention will hereinafter be described with reference to FIG. 3 which shows an embodiment of the reading apparatus according to the present invention. In FIG. 3, reference numeral 13 designates an original, reference numerals $14_1$, $14_2$ and $14_3$ denote parts of a picture or writing depicted on the original, reference numerals $15_1$, $15_2$ and $15_3$ designate imaging optical systems called zone plates, reference numerals $16_1$, $16_2$ and $16_3$ denote the images of the parts $14_1$, $14_2$ and $14_3$ of the picture or writing on the original, reference numerals $17_1$, $17_2$ and $17_3$ designate thin film sensors represented by amorphous silicon or the like, and reference numerals 18 and 19 denote optically transparent mediums such as glass.

Figure 4A:
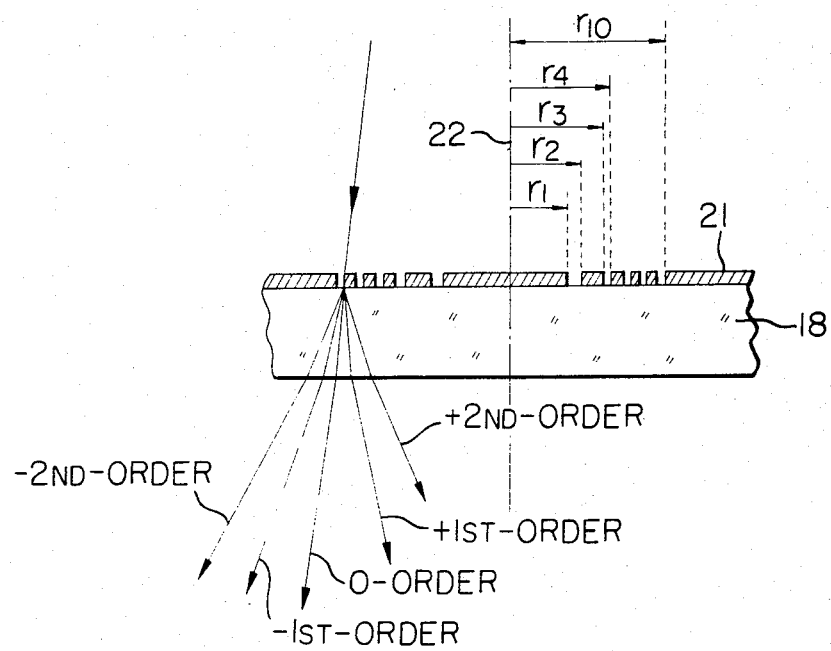
FIGS. 4(A) and 4(B) illustrate the zone plates shown in FIG. 3.

The thin film sensors are provided on the transparent substrate 19, and the zone plates are provided on the transparent substrate 18. FIG. 4(A) is an enlarged view of a zone plate and illustrates the manner in which a metal film 21 of Cr is provided on the transparent substrate 18. FIG. 14(B) is a view of the FIG. 4(A) arrangement as seen in the direction of the optical axis 22. As is well known, a Fresnel zone plate has an imaging function similar to that of a lens, and if, as shown in FIGS. 4(A) and (B), annular zones through which light may pass and opaque annular zones are provided alternately and the dimensions of the annular zones having radii $\gamma m$ and $\gamma m+1$ $(m=1, 2, 3, \ldots)$ are given by $\gamma m = \sqrt{f \times \lambda \times m}$, then the Fresnel zone plate will bring about an imaging function similar to that of a lens having a focal length f. In the above equation, $\lambda$ is the wavelength of light. The first-order diffracted light diffracted by each annular zone in FIG. 4 brings about an imaging function having a focal length f. Monochromatic light or semi-monochromatic light is often used with zone plates to reduce the so-called chromatic abberation. FIGS. 4(A) and (B) show an example of the case where $m=10$, and the opaque film 21 for intercepting light may be obtained by evaporating a metal film such as Cr or the like. Consider, for example, a case where the focal length $f=10$ mm, the wavelength of light $\lambda=546.07$ nm (monochromatic light) and the number of annular zones $m=200$. At this time, the radius of the minimum circle is $\gamma_1 = 0.07389$ mm and the radius of the outermost annular zone is $\gamma_{200} = 1.04499$ mm or $\gamma_{199} = 1.020966$ mm. That is, the width of the outermost annular zone is $2.4\mu$ which is given by $\gamma_{200} - \gamma_{199}$. Providing opaque film in the form of such annular zones is possible by the photoetching technique which is well known as a step of the IC manufacturin process, and a number of zone plates can be provided on the substrate 18 at a time and with high accuracy. On the other hand, the thin film sensors $17_1$, $17_2$, $17_3$, ... represented by amorphous silicon or the like are unitarily provided in a desired pattern on the transparent substrate 19 by a photoetching technique similar to that used to form the zone plates, and in order that the position adjustment of the thin film sensors $17_1$, $17_2$, $17_3$, ... and the zone plates $15_1$, $15_2$, $15_3$, ... may be accomplished below $10\mu$-$20\mu$, a reference pattern for position adjustment obtained from one and the same mask may be provided by the use of the photoetching technique, for example, on the transparent substrate 19 on which the thin film sensors $17_1$, $17_2$, $17_3$, ... have been provided and on the transparent substrate 18 on which the zone plates $15_1$, $15_2$, $15_3$, ... have been provided. Thus, it becomes unnecessary to adjust individual imaging elements with respect to the individual sensors and it can be comparatively easily achieved to position-adjust a unitized imaging system relative to a unitized sensor with high accuracy (for example, several microns or less). Also, the substrates of both the imaging system and the sensor are formed of a material such as glass or the like which is excellent in environmental resistance and, where the substrates of both the imaging system and the sensor are formed of the same material, both the sensor and the imaging system have an equal amount of thermal expansion and therefore, the positional deviation between the imaging system and the sensor which may result from a temperature change becomes null. If glasses, not of the same type and yet having a slight coefficient of thermal expansion, are chosen, the positional deviation between the imaging system and the sensor can be minimized to the required accuracy (for example, $20\mu$ or less) by the expansion and contraction resulting from a temperature change.

Figure 5A:
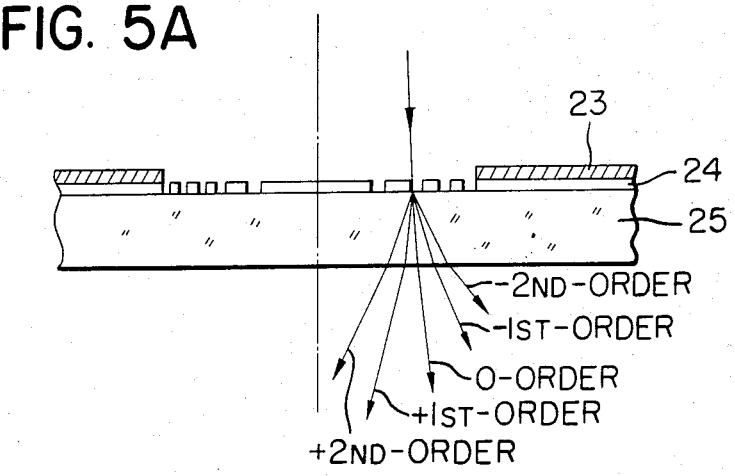
FIGS. 5(A) and 5(B) illustrate the phase type zone plate.

The example shown in FIGS. 4(A) and (B) is one in which opaque areas and transparent areas are alternately provided with respect to the annular zones from the center. This is called the amplitude type zone plate and is well known. In this example, the minimum circle is opaque, but generally the minimum circle may be transparent and then opaque portions and transparent portions may be alternate outwardly. Although the zone plate passes light through the entire area thereof as shown in FIGS. 5(A) and (B), it may also be provided with a transparent film 24 through which the phase will be alternately increased by $\lambda/2$ ($\lambda$: wavelength of light) with respect to the annular zones from the center. This is called the phase type zone plate and is well known. In FIG. 5(A), assuming that the refractive index of the transparent film 24 which provides a phase deviation is np and that the thickness thereof is dp, then $(np-1)dp=\lambda/2$ ($\lambda$: wavelength of light). An opaque film 23 provided over the transparent film 24 is a metal film such as Cr or the like. This is for the purpose of intercepting any stray light coming from the original, because the outward surface of the zone plate is an ineffective area which does not contribute to the imaging.

As described above, if the zone plates as shown in FIGS. 4(A) and (B) and FIGS. 5(A) and (B) are used as the imaging systems $15_1$, $15_2$, $15_3$, ..., there can be provided a compact original reading apparatus which satisfies severe position adjustment of the sensors $17_1$, $17_2$, $17_3$, ... and the imaging systems $15_1$, $15_2$, $15_3$, ... and which is suitable for mass production. In FIG. 3, reference numerals $20_1$, $20_2$, $20_3$ and $20_4$ designate light-intercepting means for eliminating any light beam which may enter the sensor $16_2$ from the other area of the original through the other imaging system than the imaging system $15_2$, for example, the adjacent imaging system $15_1$ or $15_3$. Next, the brightness of the zone plates shown in FIGS. 4(A) and (B) and FIGS. 5(A) and (B) will be compared with that of a lens. The areas of the annular zones of the zone plate are all equal to one another and are $f\lambda\pi$. Accordingly, if the number of zones m=200 and the wavelength $\lambda$=546.07 nm where f=10 mm, the radius of the outermost annular zone $\gamma_{200}$=1.044 mm and therefore the F-No. of the zone plate of the type shown in FIGS. 4(A) and (B) is $f/(2\gamma_{200})\times 2 \simeq 9.6$. The F-No. of the zone plate of the type shown in FIGS. 5(A) and (B) is $f/(2\gamma_{200})\simeq 4.8$. As will be seen from this, the light condensing capability, namely, the so-called brightness, of the zone plate as an imaging element becomes equal to that of an ordinary lens if the number of zones is selected to about 200.

Another embodiment of the present invention will now be described by reference to the drawings.

FIGS. 6 to 12 show combinations of relative positional relations between the substrate of the zone plates, the substrate of the thin film sensors and the light-intercepting means for eliminating any light beam which enters the sensor from other area of the original. In FIGS. 6-12, reference numeral 26 designates an original, reference numerals $27_1$, $27_2$ and $27_3$ denote parts of a picture or writing depicted on the original, reference numerals $28_1$, $28_2$ and $28_3$ designate zone plates, reference numeral 29 denotes a transparent substrate on which the zone plates are provided, reference numeral 30 designates a substrate on which sensors are provided, reference numerals $31_1$, $31_2$, $31_3$ and $31_4$ denote light-intercepting means, reference numerals $32_1$, $32_2$ and $32_3$ designate sensors, and reference numerals $33_1$, $33_2$ and $33_3$ denote the images of the parts $27_1$, $27_2$ and $27_3$, respectively, of the picture or writing on the original. The substrates 29 and 30 are not restricted to glass substrates but may be transparent substrates formed of any other materials which are identical or substantially identical in their coefficient of linear expansion. The sensors $32_1$, $32_2$ and $32_3$ are not restricted to thin film sensors formed of a material such as amorphous silicon but may be solid sensors such as CCD. Also, the sensors are not restricted to one-dimensional sensors but may be ones arranged in a staggered fashion or in the ordinary two-dimensional fashion. In the latter case, the arrangement of the zone plates may be in a one-dimensional fashion or in a staggered fashion or in an ordinary two-dimensional fashion, and the manner of arrangement may be selected as the case may be.

Figure 13:
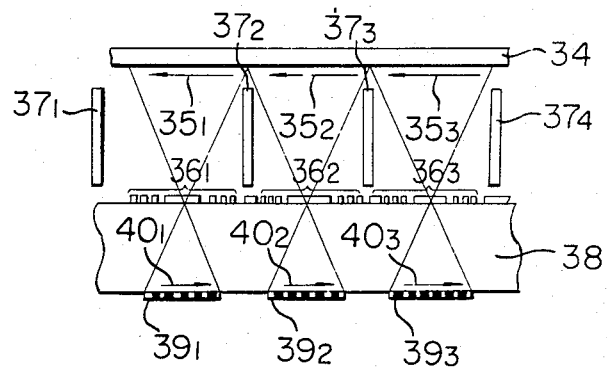

Still another embodiment of the present invention is shown in FIG. 13. FIG. 13 shows an example of the case where zone plates and sensors are provided on one and the same transparent substrate. In FIG. 13, reference numeral 34 designates an original, reference numerals $35_1$, $35_2$ and $35_3$ denote parts of a picture or writing depicted on the original, reference numerals $36_1$, $36_2$ and $36_3$ designate zone plates, reference numerals $37_1$, $37_2$, $37_3$ and $37_4$ denote light-intercepting means, reference numeral 38 designates a transparent substrate on which zone plates and sensors are provided, reference numerals $39_1$, $39_2$ and $39_3$ denote sensors, and reference numerals $40_1$, $40_2$ and $40_3$ designate the images of the parts $35_1$, $35_2$ and $35_3$, respectively, of the picture or writing on the original.

Figure 14:
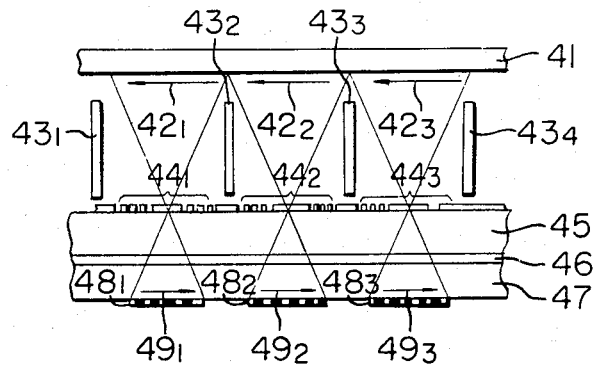
Figure 15A:
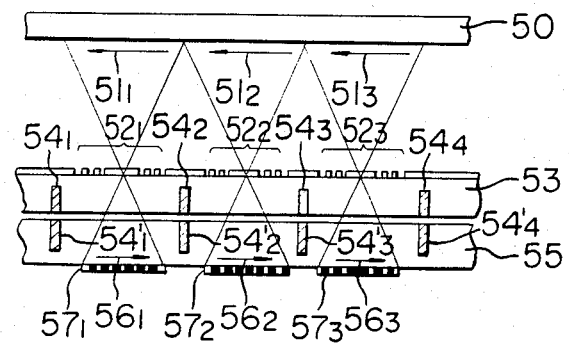
Figure 15B:
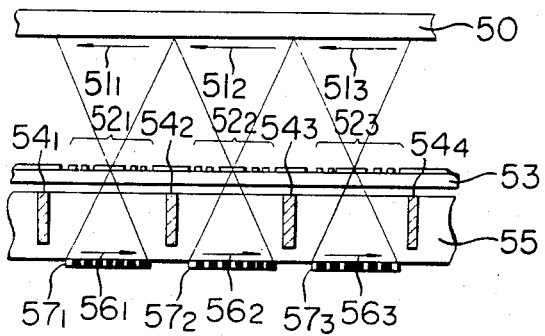

FIG. 14 shows a further embodiment. FIG. 14 illustrates an example in which a transparent substrate 45 on which zone plates are provided and a transparent substrate 47 on which sensors are provided are secured together by transparent adhesive 46. In FIG. 14, reference numeral 41 designates an original, reference numerals $42_1$, $42_2$ and $42_3$ denote parts of a picture or writing depicted on the original, reference numerals $43_1$, $43_2$, $43_3$ and $43_4$ designate light-intercepting means, reference numerals $44_1$, $44_2$ and $44_3$ denote zone plates, reference numerals $48_1$, $48_2$ and $48_3$ designate sensors, and reference numerals $49_1$, $49_2$ and $49_3$ denote the images of the parts $42_1$, $42_2$ and $42_3$, respectively, of the picture or writing on the original. In the embodiments of FIGS. 13 and 14, the substrates of the zone plates and the sensors are not restricted to glass, but as already described with respect to FIGS. 6-12, other transparent substrate may be used both in the case of FIG. 13 wherein the zone plates and sensors are provided on one and the same substrate and in the case of FIG. 14 if the coefficients of linear expansion of the two substrates are equal or substantially equal to each other. Again in both FIG. 13 and FIG. 14, the sensors are not restricted to thin film sensors such as amorphous silicon but may also be solid sensors such as CCD. The sensor arrangement is neither restricted to a one-dimensional arrangement but may also be a staggered arrangement or an ordinary two-dimensional arrangement. In that case, the arrangement of zone plates may be a one-dimensional arrangement or a staggered arrangement or an ordinary two-dimensional arrangement, and the manner of arrangement may be selected as the case may be.

The embodiments shown in FIGS. 15 to 21 are ones in which the light-intercepting means are provided in at least one of the substrate on which the imaging systems are provided and the substrate on which the sensors are provided. The embodiments of FIGS. 15(A) and (B) are ones in which zone plates $52_1$, $52_2$ and $52_3$ lie on the original 50 side with respect to an optically transparent substrate 53 and sensors $57_1$, $57_2$ and $57_3$ are provided on the side opposite to the original 50 with respect to the substrate 55. In both FIG. 15(A) and FIG. 15(B), light-intercepting means $54_1$, $54_2$, $54_3$, $54_4$ or $54_{1'}$, $54_{2'}$, $54_{3'}$, $54_{4'}$, are in the positional relation as shown and are provided on at least one of the substrate on which zone plates are provided and the substrate on which sensors are provided. This eliminates the necessity of providing light-intercepting means on any other portion than transparent substrates 53 and 55 and enables a compact design to be achieved. Designated by $56_1$, $56_2$ and $57_{31}$ are the images of the parts $51_1$, $51_2$ and $51_3$ of the picture or writing formed on the sensors by the zone plates.

Figure 16A:
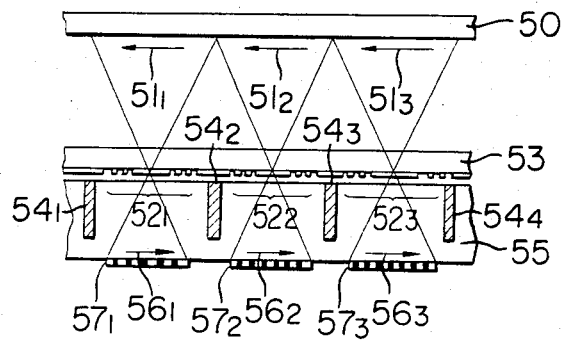
Figure 16B:
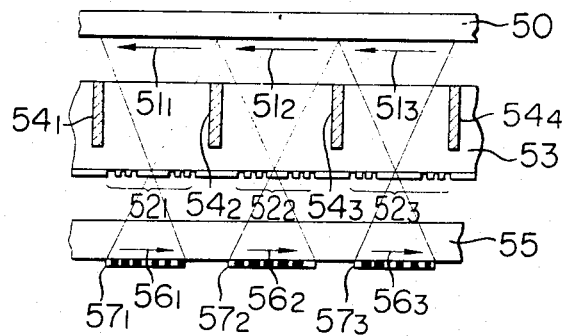
Figure 16C:
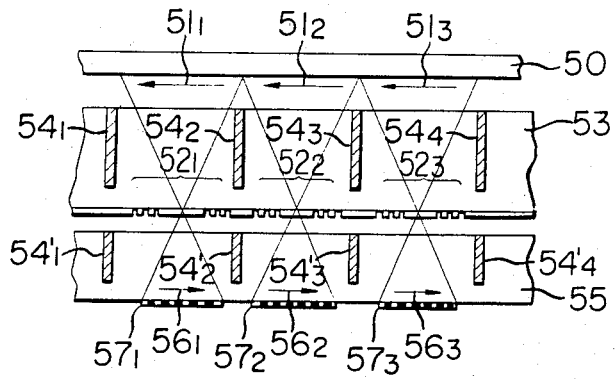

FIGS. 16(A), (B) and (C) show embodiments in which, when zone plates $52_1$, $52_2$, $52_3$, ... lie on the side opposite to an original 50 with respect to an optically transparent substrate 53 and sensors $57_1$, $57_2$, $57_3$, ... are provided on the side opposite to the original 50 with respect to a substrate 55, light-intercepting means $30_1$, $30_2$, $30_3$, $30_4$ or $54_{1'}$, $54_{2'}$, $54_{3'}$, $54_{4'}$ are provided in the shown positional relation on at least one of the substrate on which zone plates are provided and the substrate on which sensors are provided.

Figure 17:
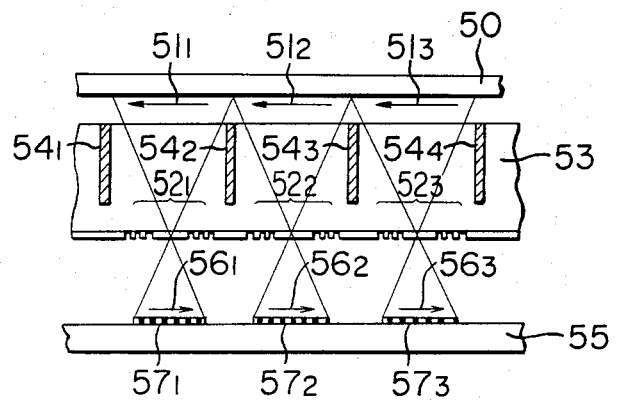

Similarly, FIG. 17 shows an embodiment in which light-intercepting means $54_1$, $54_2$, $54_3$, $54_4$ are provided on a transparent substrate 53 when zone plates $52_1$, $52_2$, $52_3$ lie on the side opposite to an original 50 with respect to the substrate 53 and sensors $57_1$, $57_2$, $57_3$, ... are provided on the original 50 side with a substrate 55.

Figure 18:
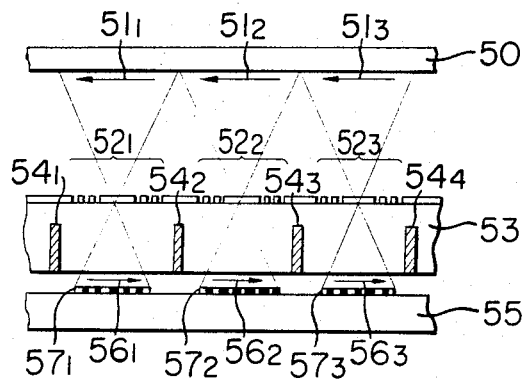

FIG. 18 illustrates an embodiment in which light-intercepting means $54_1$, $54_2$, $54_3$, $54_4$ are provided on a transparent substrate 53 when zone plates $52_1$, $52_2$, $52_3$, ... lie on the same side as an original 50 with respect to the substrate 53 and sensors $57_1$, $57_2$, $57_3$ are provided on the same side as the original 50 with respect to a substrate 55.

FIGS. 15–18 show examples of the case where the transparent substrate 53 on which zone plates $52_1$, $52_2$, $52_3$ are provided is separated from the substrate 55 on which sensors $57_1$, $57_2$, $57_3$ are provided. The light-intercepting means $54_1$, $54_2$, $54_3$, $54_4$ or $54_{1'}$, $54_{2'}$, $54_{3'}$, $54_{4'}$ indicated by hatching in FIGS. 15–18 may be accomplished by providing kerfs in the opposite surface of the substrate on which the zone plates or the sensors are provided or by filling the kerfs with a light-absorbing coating material. As shown in FIGS. 15–18, these kerfs are not so deep as to completely penetrate into the substrate on which the zone plates or the sensors are provided.

Figure 19:
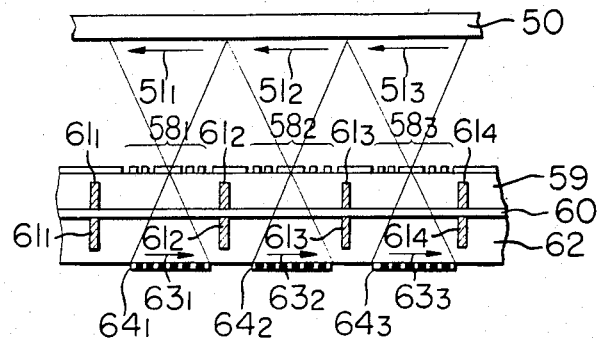

FIG. 19 shows an embodiment in which light-intercepting means $61_1$, $61_2$, $61_3$, $61_4$ or $61_{1'}$, $61_{2'}$, $61_{3'}$, $61_{4'}$ are provided on both a transparent substrate 59 on which zone plates $58_1$, $58_2$, $58_3$ are provided and a transparent substrate 62 on which sensors $64_1$, $64_2$, $64_3$ are provided and the substrates 59 and 62 are secured together by transparent adhesive 60. The light-intercepting means $61_1$, $61_2$, $61_3$, $61_4$ and $61_{1'}$, $61_{2'}$, $61_{3'}$, $61_{4'}$ need not always be coincident in position on the adhesively secured surface. Designated by $63_1$, $63_2$, $63_3$ are the images of the parts $51_1$, $51_2$, $51_3$ of a picture or writing formed on the sensors $64_1$, $64_2$, $64_3$ by the zone plates $58_1$, $58_2$, $58_3$.

Figure 20:
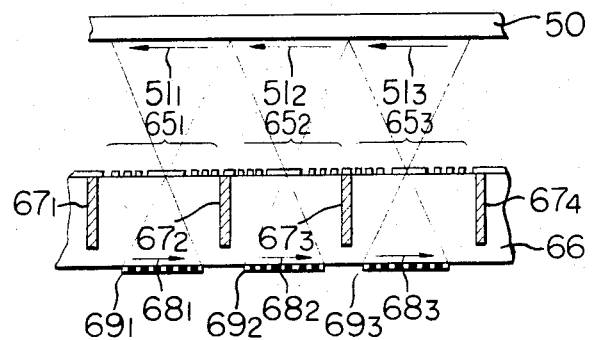
Figure 21:
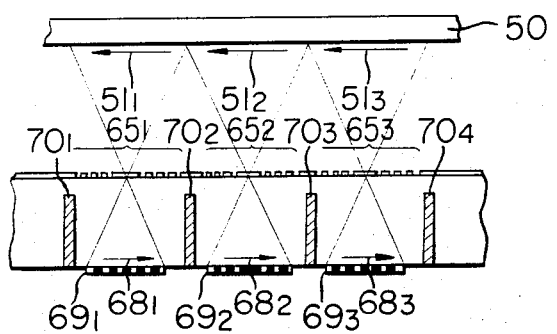

FIGS. 20 and 21 show embodiments in which the substrate of imaging systems $65_1$, $65_2$, $65_3$ and the substrate of sensors $69_1$, $69_2$, $69_3$ are identical. FIG. 20 shows an example in which kerfs $67_1$, $67_2$, $67_3$, $67_4$ are provided in that surface of a transparent substrate 66 on which imaging systems are provided, and FIG. 21 shows an example in which kerfs $70_1$, $70_2$, $70_3$, $70_4$ are provided in that surface of the transparent substrate 66 on which sensors are provided. Denoted by $68_1$, $68_2$ and $68_3$ are the images of the parts $51_1$, $51_2$ and $51_3$ of a picture or writing formed on the sensors $69_1$, $69_2$ and $69_3$ by the zone plates $65_1$, $65_2$ and $65_3$.

Description will now be made of an embodiment in which, of the diffracted lights of the zone plates, the other diffracted lights than the first-order diffracted light are elaborately intercepted.

Figure 22:
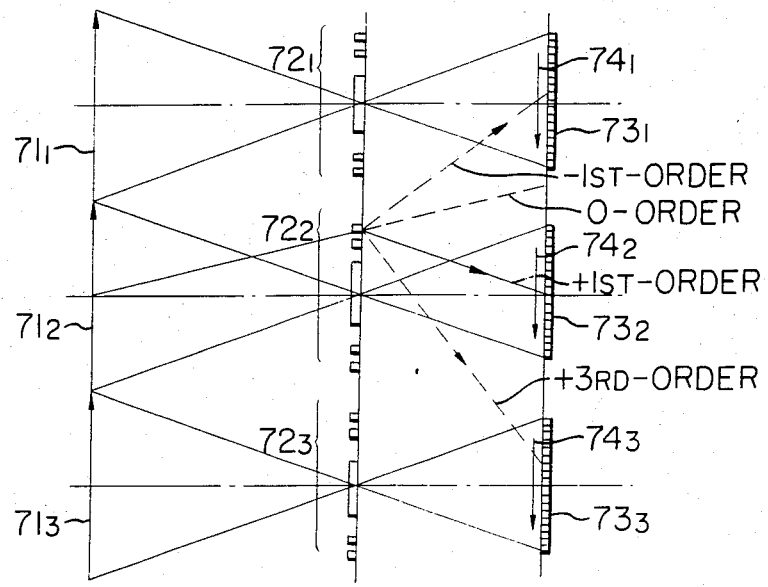
FIG. 22 illustrates the manner in which various diffracted lights passed through zone plates impinge on photosensors.

FIG. 22 shows the conditions of diffracted lights which, when zone plates are used as ommatea, contribute to the imaging on the surface of sensors $73_1$, $73_2$, $73_3$ after the lights from objects $71_1$, $71_2$, $71_3$ have entered the zone plates $72_1$, $72_2$, $72_3$ and the conditions of diffracted lights which provide noise components. In the case of a zone plate, the diffracted light utilized to obtain images $74_1$, $74_2$, $74_3$ is +1st-order light as shown in FIG. 22, and 0-order light (rectilinearly travelling light) and the other diffracted lights, namely, −1st-order light, ±3rd-order lights, etc. provide noise components on the image plane, thus bringing about a reduced contrast of the image. For example, as shown in FIG. 22, these lights enter the adjacent sensor group as stray light and this is not preferable.

The embodiments shown in FIGS. 22–27 are ones in which the reduction of the contrast of the image brought about by the other diffracted lights than the +1st-order diffracted light is prevented.

Figure 23:
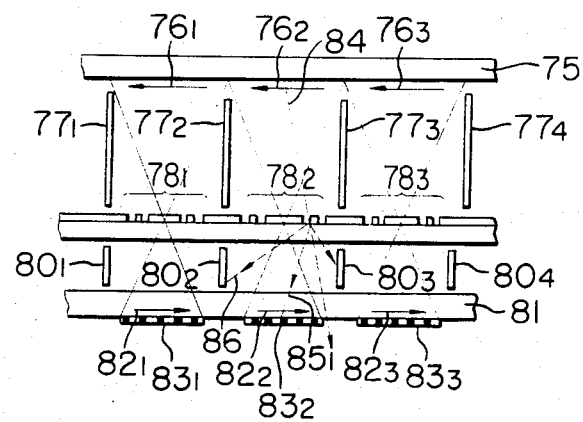
FIGS. 23, 24, 25, 26 and 27 show further embodiments of the reading apparatus according to the present invention.

In FIG. 23, reference numeral 75 designates original paper, reference numerals $76_1$, $76_2$ and $76_3$ denote originals to be read, reference numerals $78_1$, $78_2$, $78_3$ designate zone plates provided on a glass substrate 79, reference numerals $77_1$–$77_4$ and $80_1$–$80_4$ denote light-intercepting plates, and reference numerals $82_1$–$82_3$ designate the images of the originals. In the example shown in FIG. 23, there are provided means $77_1$–$77_4$ for intercepting the lights passing from the other portions than a predetermined area of the originals through an adjacent zone plate to sensors $83_1$, $83_2$, $83_3$ provided on a glass substrate 81, and means $80_1$–$80_4$ for intercepting diffracted lights 86 and 87 entering the sensors, of the other diffracted lights 86, 87, 88 than the diffracted light 85 used for imaging, of the diffracted light of the incident light beam 84 by the zone plates, as described with reference to FIG. 22.

Thus, the present embodiment is an original reading apparatus having means for intercepting the light passing from other than the predetermined area of the original through an adjacent zone plate to the sensors and means for intercepting the other diffracted lights (including the rectilinearly travelling 0-order light) than the diffracted light contributing to the imaging, of the diffracted light by the zone plates, and which is compact and can provide a high contrast.

Figure 24:
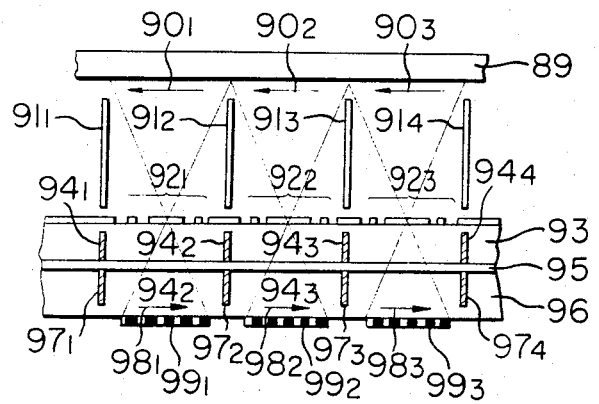
Figure 25:
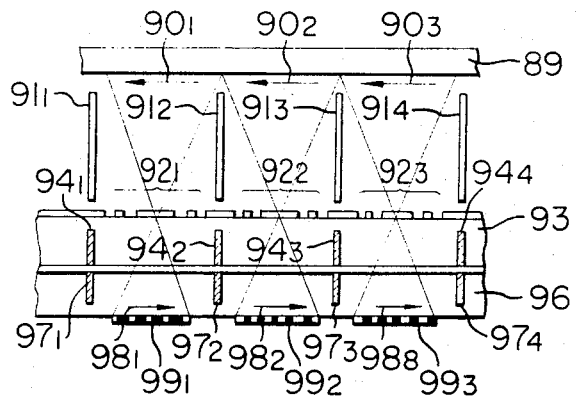

FIG. 24 illustrates a case where light-intercepting kerfs $94_1$–$94_4$ and $97_1$–$97_4$ are provided in a substrate 93 on which zone plates $92_1$, $92_2$, $92_3$ are provided and a substrate 96 on which sensors $99_1$, $99_2$, $99_3$ are provided, the two substrates being secured together by adhesive 95. Alternatively, the light-intercepting kerfs may be provided in only one of the substrates of the zone plates and the sensors in accordance with the thicknesses of the substrates. Designated by $91_1$–$91_4$ are means for intercepting the lights passing from the other portion than the predetermined areas $56_1$, $56_2$, $56_3$ of the original 55 through an adjacent zone plate to the sensors. The embodiment of the reading apparatus shown in FIG. 25 shows a case where, in the construction of the FIG. 24 embodiment the substrate of zone plates is not adhesively secured to the substrate of sensors. In FIG. 25, reference numerals similar to those in FIG. 24 designate similar members. In the embodiment shown in FIG. 25, it is preferable that the spacing between the two substrates be small.

Figure 26:
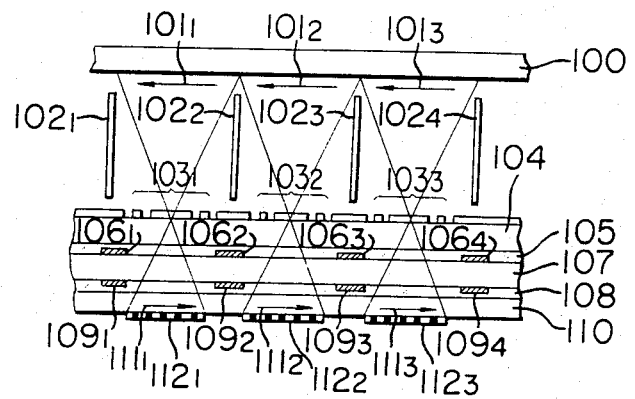

In an embodiment shown in FIG. 26, reference numerals 104, 107 and 110 respectively designate a substrate on which zone plates $103_1$, $103_2$, $103_3$ are provided, a substrate on which light-intercepting masks $106_1$–$106_4$ and $109_1$–$109_4$ are provided in the form of thin film (for example, evaporated metal film), and a substrate on which sensors $112_1$–$112_3$ are provided. These three substrates are secured together by adhesives 105 and 108. Designated by $111_1$, $111_2$ and $111_3$ are the images of the predetermined areas $101_1$, $101_2$ and $101_3$ of the original formed on the sensors. Light-intercepting plates $102_1$–$102_4$ are means for intercepting the light passing from the other portion than the predetermined areas $101_1$, $101_2$, $101_3$ of the original 100 through an adjacent zone plate to the sensors, and light-intercepting masks $106_1$–$106_4$ and $109_1$–$109_4$ are means for intercepting the other diffracted lights (including the rectilinearly travelling component called the 0-order light component) than the diffracted light used for the imaging, of the diffracted light by the zone plates. The mutual position adjustment of the zone plates and the light-intercepting masks $106_1$–$106_4$ and $109_1$–$109_4$ and the sensors $112_1$–$112_4$, if all of the zone plates, light-intercepting masks and sensors are formed of thin films, may be accomplished by providing in advance a positioning pattern on a photomask used for patterning them respectively, and photoetching such pattern and effecting a position-adjusting operation when they are adhesively secured together.

Figure 27:
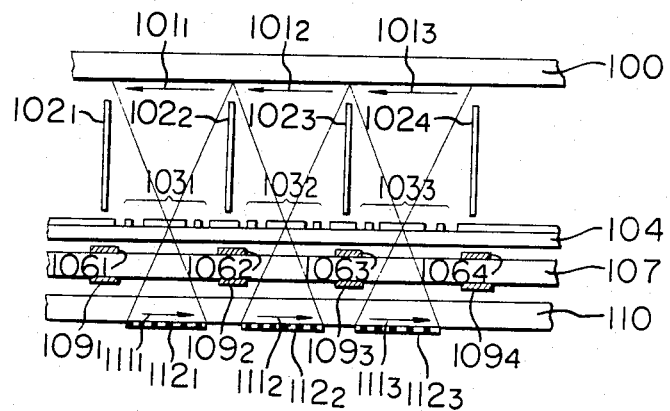

An embodiment of the reading apparatus shown in FIG. 27 shows a case where, in the embodiment of FIG. 26, the substrate on which zone plates are provided, the substrate on which light-intercepting masks are provided and the substrate on which sensors are provided are separated from one another.

In FIGS. 26 and 27, the light-intercepting masks may alternatively be provided on the substrate of the zone plates or on the substrate of the sensors. Also, in the case of FIGS. 26 and 27, two light-intercepting masks are arranged with respect to the direction of the optical axis of the imaging system, whereas generally the number of such masks may be arbitrary and their arrangement may be designed such that the desired purpose of light interception can be sufficiently achieved. The alignment error of the light-intercepting plates in a direction perpendicular to the direction of the optical axis may be greater by about one unit than the alignment error $10\mu$–$20\mu$ between the zone plates and the sensors. In the embodiments shown above, the substrates on which zone plates, sensors and light-intercepting masks are respectively provided are not restricted to glass, but any transparent material having the same degree of coefficient of linear expansion as glass may be used. The sensors are not restricted to thin film sensors such as amorphous silicon but may be solid sensors such as CCD. The sensor arrangement is neither restricted to a one-dimensional arrangement but may be a staggered arrangement or an ordinary two-dimensional arrangement. In that case, the arrangement of zone plates may be a one-dimensional arrangement or a staggered arrangement or an ordinary two-dimensional arrangement and the manner of arrangement may be selected as the case may be.

In the above-described embodiments, means have been shown which use light-intercepting plates or light-intercepting kerfs to eliminate any deleterious light which may provide a hindrance to the reading, but such deleterious light may also be eliminated by other means and this will now be described.

Figure 5B:
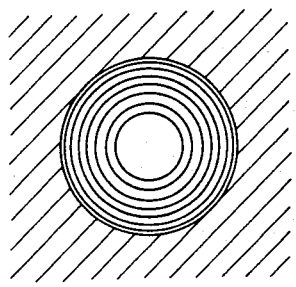
Figure 4B:
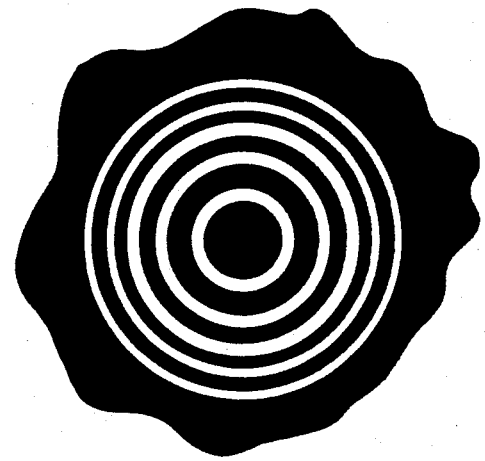
Figure 6:
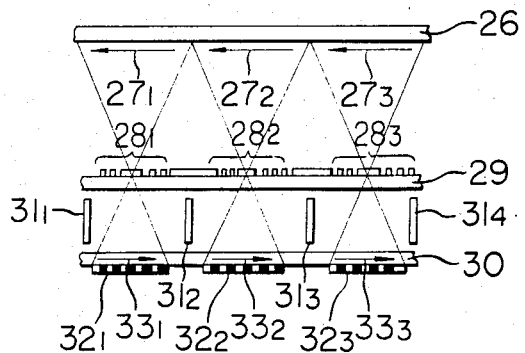
FIGS. 6, 7, 8, 9, 10, 11, 12, 13, 14, 15(A) and 15(B), 16(A), 16(B) and 16(C), 17, 18, 19, 20 and 21 show embodiments of the reading apparatus according to the present invention.
Figure 7:
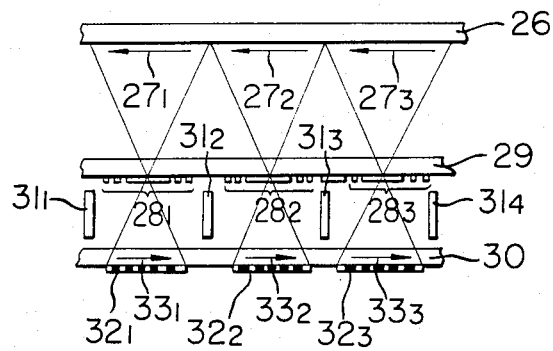
Figure 8:
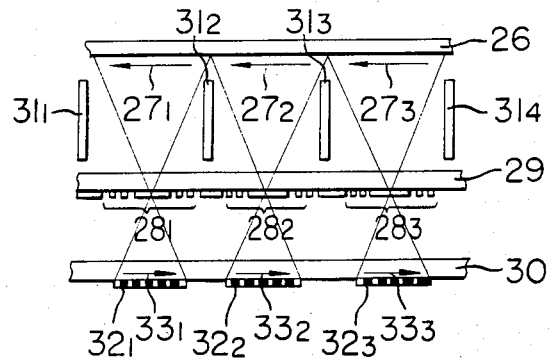
Figure 9:
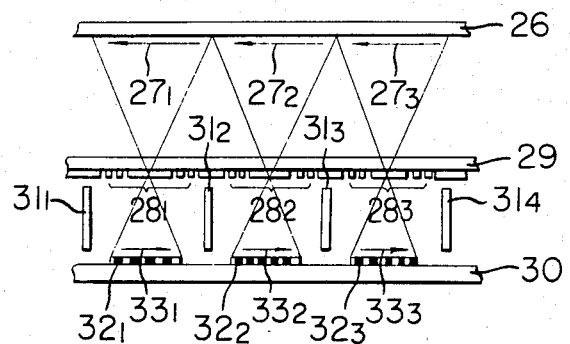
Figure 10:
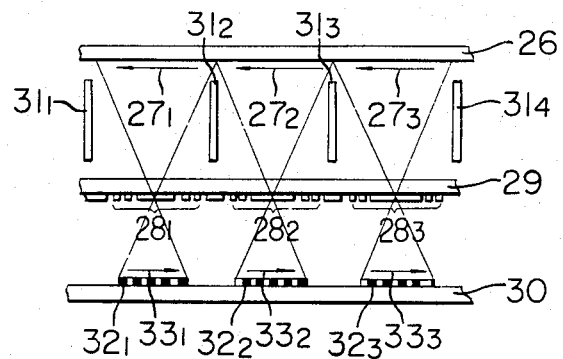
Figure 11:
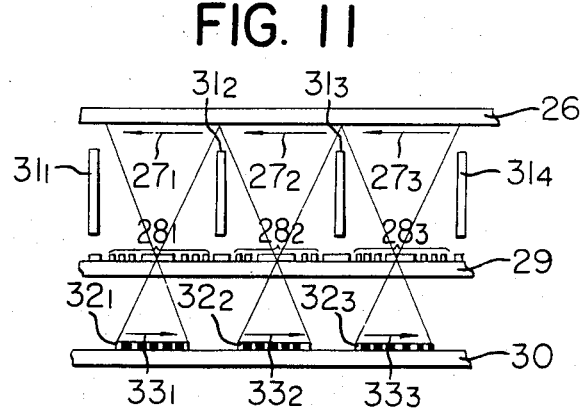
Figure 12:
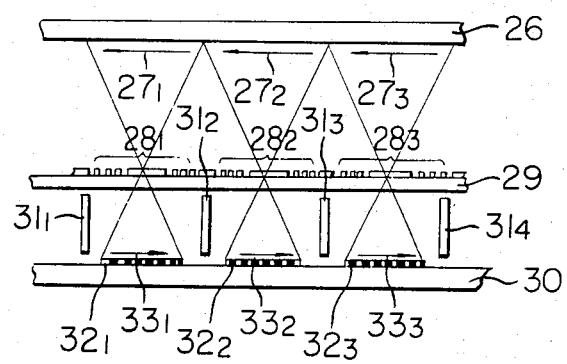

Generally, as shown in FIGS. 4 and 5, there is a number of orders of light diffracted by zone plates, and the number of diffraction orders used for the imaging is usually the diffracted light having the greatest diffraction efficiency, for example, +1st-order or −1st-order diffracted light for the phase type Fresnel zone plate. However, the other light than the diffraction order used for the imaging arrives at the surface of the sensor to thereby form a so-called flare light, which may cause reduction of the signal-to-noise ratio in the image plane, namely, the S/N ratio. The S/N ratio and the flare rate are in the following relation:

$$FL(\%) = \frac{N}{S+N} \times 100 = \frac{N/S}{1+N/S} \times 100(\%) \quad (2)$$

where $FL(\%)$ is the flare rate.

What quantity the flare rate specifically is will now be shown by taking a phase type Fresnel zone plate (the zone plate shown in FIG. 5) as an example.

Figure 28:
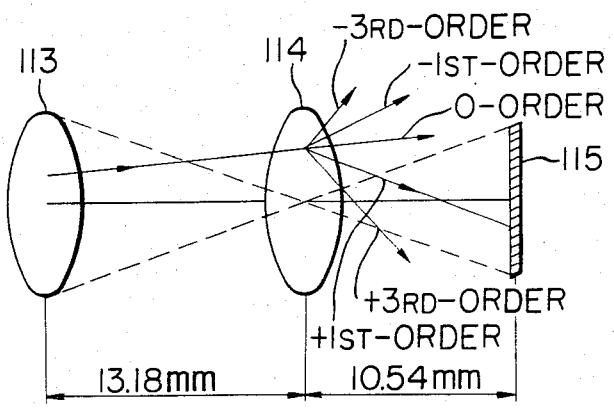
FIG. 28 illustrates the manner in which light having left the object surface is diffracted by a zone plate.

FIG. 28 shows the condition of 0.8 time reduced inverted imaging using a Fresnel zone plate. Reference numeral 113 designates the visual field on the original surface, reference numeral 114 denotes a Fresnel zone plate, and reference numeral 115 designates a thin film sensor represented by amorphous silicon or a solid sensor represented by CCD, the sensor 115 being a one-dimensional sensor. The distance between the original surface and the zone plate is 13.18 mm, and the distance between the zone plate and the one-dimensional sensor is 10.54 mm. As shown in FIG. 28, a number of order of lights such as 0-order light (rectilinearly travelling light), ±1st-order lights, +2nd-order lights, etc. are created on the surface of an ordinary zone plate, and in the case of an ideally made phase type Fresnel zone plate, the diffraction efficiencies of respective diffracted lights are such that 0-order light (rectilinearly travelling light) is 0%, ±1st-order lights are 40%, ±2nd-order lights are 0%, ±3rd-order lights are about 4.1%, ±4th-order lights are 0%, ±5th-order lights are 1.6%, and so on.

Figure 29A:
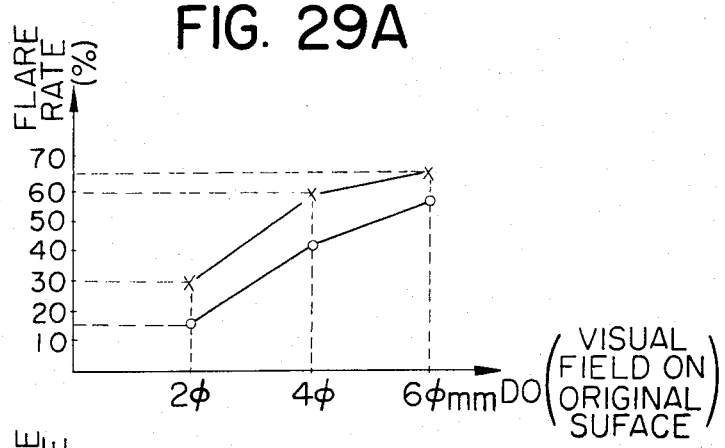
FIGS. 29(A) and 29(B) show the relation between the size of the visual field on the original surface and the flare rate when the visual field on the original surface is circular.
Figure 29B:
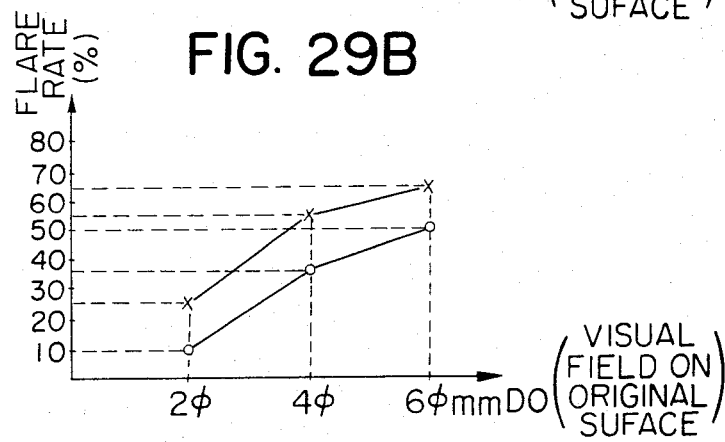

The diffraction efficiency is the ratio of the quantity of each order diffracted light to the light incident on the zone plate, indicated in percentage. The words "ideally made" mean that the zone plate is properly set in the relation that $(np-1)\cdot dp = \lambda/2 \times N$ (N: odd number), where $\lambda$ is the wavelength of the incident light, dp is the thickness of the transparent film 24 providing a phase deviation and np is the refractive index of such film, that it is a requisite condition that the radius $\gamma m$ (m: integer) of the pattern of the zone accurately satisfies $\gamma m = \sqrt{f \times \lambda \times m}$ (f: focal length), and that as shown in FIG. 5A, the cross-section of the layer 24 providing a phase deviation is made rectangular. Accordingly, in the process of making such zone plate, if the width of the annular zone of the pattern is slightly deviated or the thickness dp of the transparent film slightly departs from the above-mentioned ideal condition or the cross-section thereof is not rectangular but in a disturbed state, the diffraction efficiency of each diffracted light previously shown will change or 0-order (rectilinearly travelling light) diffracted light will be created. In view of these, in the arrangement shown in FIG. 28, the flare rate on the surface of the one-dimensional sensor caused by each diffraction order of light has been calculated by varying the diameter DO of the visual field on the original surface and the diameter DE of the zone plate. The calculation has been estimated by finely dividing the visual field on the original surface and the pupil plane of the zone plate and tracking each order of light as shown in FIG. 28. The result of the calculation is shown in FIG. 29. FIG. 29A refers to a case where the diameter DE of the zone plate is DE=1.38 mm, which corresponds to a case where the number of annular zones is 150. FIG. 29B) refers to a case where the diameter of the zone plate is 1.60 mm, which corresponds to a case where the number of annular zones is 200. In FIGS. 29A and B, mark O refers to a case where it is assumed that the phase type Fresnel zone plate has been ideally made, and mark X shows the flare rate sensed by a one-dimensional sensor which has been calculated on the assumption that 0-order diffraction efficiency is 20%, ±1st-order diffracted lights are 30% and ±3rd-order diffracted lights are 10%. As seen in FIG. 29, in a zone plate of any size, when the size of the visual field on the original surface is about 2 mm 100 –3 mm100 of the size usually considered necessary, the flare rate is as great as 20% 14 40% and this is inconvenient. For example, in an original reading apparatus like a facsimile, transformation into a binary form is effected by providing a slice level for an electrical signal obtained from a one-dimensional sensor, and depending on the manner of setting of the slice level in the case of such transformation into a binary form, more or less flare light can be discarded, but if the flare rate is too high, there will occur a case that the setting of the slice level becomes difficult and stable, accurate reading of the original becomes impossible. Therefore, it becomes necessary to reduce the flare rate and this will hereinafter be described. An apparatus like a facsimile is characterized in reading an original by the so-called slit scanning and this is the reason why a one-dimensional sensor is used, and it means that the illumination of the original surface may basically be effected on a plane conjugate with the one-dimensional sensor with respect to the imaging system, that is, if one-to-one magnification imaging is to be obtained, slit illumination having a size equal to the width and length of the one-dimensional sensor may be effected. Now, as shown in FIG. 29, the cause of the high flare rate is chiefly the fact that, of the visual field on the original surface, the other light than +1st-order diffracted light which is concerned in imaging arrives from the other plane than the plane conjugate with the one-dimensional sensor and becomes flare light. Accordingly, in order to reduce the high flare rate as shown in FIG. 29, it is preferable that the illumination of the original be slit illumination and the slit width be made as small as possible so far as the relative alignment of the zone plate and the one-dimensional sensor is possible. Thus, the flare rate has been calculated by giving a slit-like width to the circular visual field on the original surface.

Figure 30:
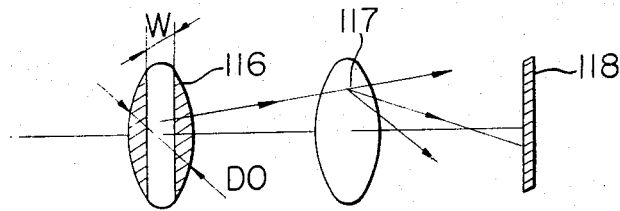
FIG. 30 illustrates the conditions of the diffraction by a zone plate when the object surface is controlled to a slit opening form.
Figure 31A:
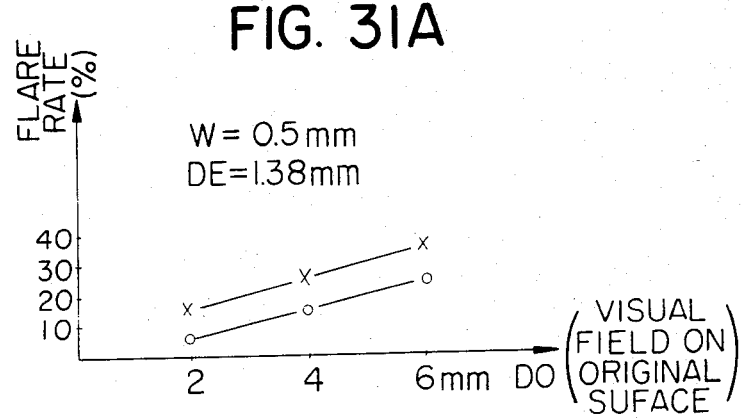
FIGS. 31(A) and 31(B) show the relation between the size of the visual field on the original surface and the flare rate when the visual field on the original surface is controlled to a slit opening form.
Figure 31B:
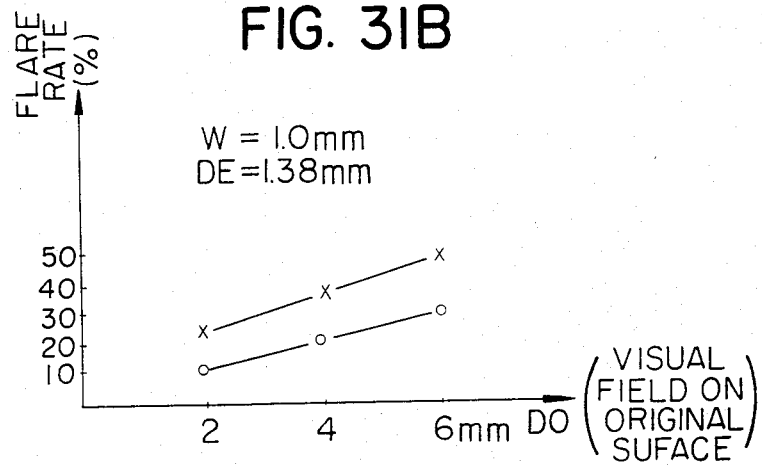

FIG. 30 shows the imaging condition when the width of the slit illumination is W. In FIG. 30, reference numeral 116 designates the visual field on the original surface, reference numeral 117 denotes a zone plate, and reference numeral 118 designates a one-dimensional sensor. The result of the calculation of the flare rate in the construction of FIG. 30 is shown in FIG. 31. FIG. 31A shows the flare rate when the visual field on the original surface has been varied in a case where the slit width W is 0.5 mm. FIG. 31B shows the flare rate when the slit width is 1.0 mm. Marks O and X are similar in significance to those in FIG. 29. As will be seen from this result, a smaller slit width greatly reduces the flare rate. With this point in view, in an original reading apparatus using zone plates, the flare rate is made smaller to improve the S/N ratio.

Figure 32A:
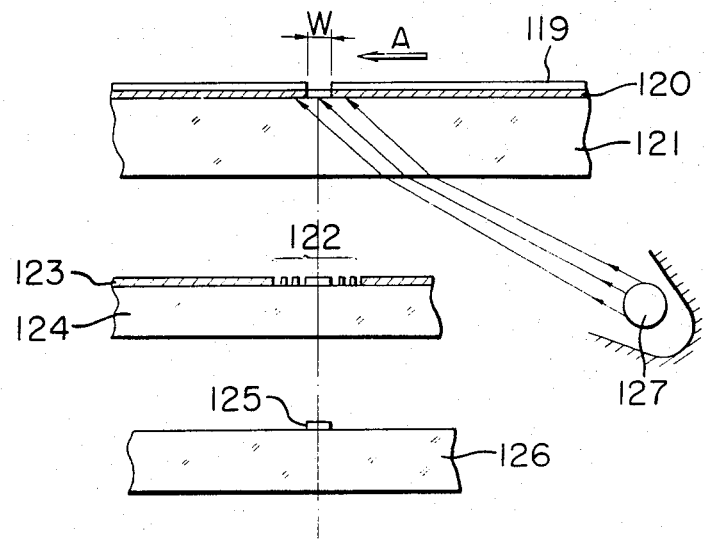
FIGS. 32(A), 32(B) and 32(C), 33, 34, 35, 36, 37(A) and 37(B), 38, 39(A) and 39(B), and 40(A) and 40(B) show still further embodiments of the reading apparatus according to the present invention.
Figure 32B:
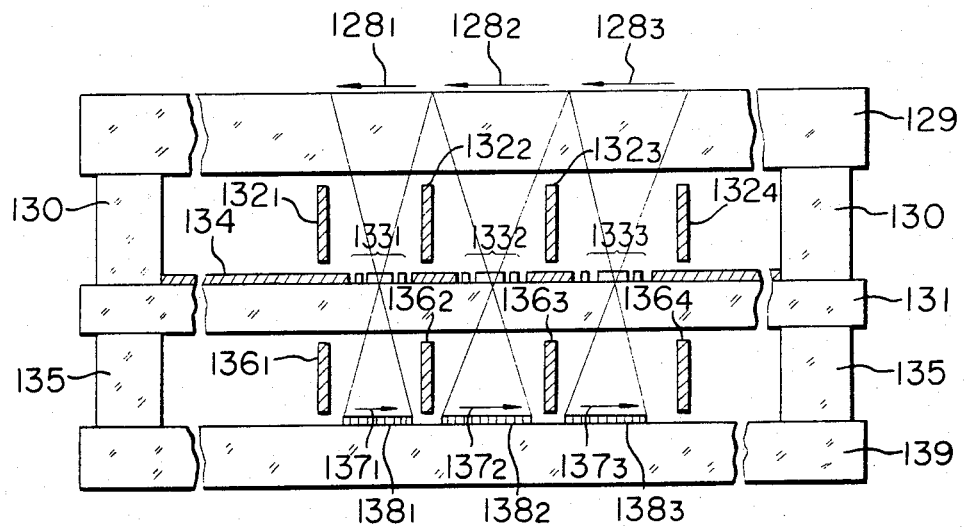
Figure 32C:
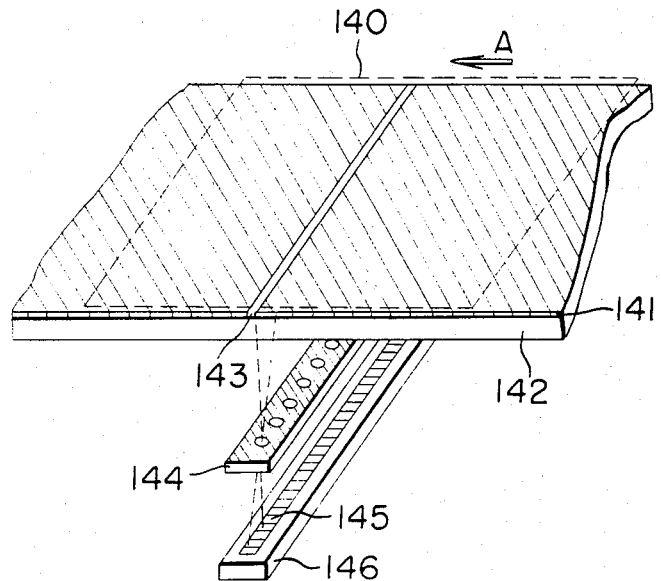

FIGS. 32–36 show an embodiment of the reading apparatus using a slit. FIG. 32A is a cross-sectional view taken when the direction A in which the original flows is seen from a side, and FIG. 32B is a view taken from the direction in which the original flows, namely, taken when the lengthwise direction of the slit of the slit illumination is seen from a side. In FIG. 32A, reference numeral 119 designates a transparent protective film, reference numeral 120 denotes a film for providing the shape of the light coming to an original having the slit width W as the opening width by an opaque thin film of Cr, Al or like material, and reference numeral 121 designates a transparent member serving also as an original supporting table. The films 119 and 120 are provided on this transparent member. Designated by 127 is an illuminating light source for illuminating the original. Reference numeral 122 designates zone plates, reference numeral 123 denotes an opaque film for providing openings to the zone plates and intercepting any light passing through the other portion than the zone plates to a sensor 125, reference numeral 124 designates a transparent member on which the zone plates are provided, and reference numeral 126 denotes a substrate on which the one-dimensional sensor 125 is provided. In FIG. 32A, even if W is 0.2 mm—0.3 mm, for example, the width of the sensor 125 is 125$\mu$ in the case of 8 pel, for example, and therefore this arrangement can be sufficiently used if the position adjustment between the slit W and the zone plates and the sensor is effected below about 30$\mu$. The position adjustment between the slit and the zone plates and the sensor may be accomplished in the following manner. The slit, the zone plates and the sensor are all achieved by the use of a patterning technique such as photoetching and therefore, when each pattern is made, a reference pattern for position adjustment may be provided in advance and these may be fixed or unitized with the reference pattern as a mark. To show these situations, description will now be made with reference to FIG. 32B. In FIG. 32B, reference numerals $128_1$, $128_2$ and $128_3$ are pictures or writings on the original and these are imaged on sensors $138_1$, $138_2$ and $138_3$ by zone plates $133_1$, $133_2$ and $133_3$. Reference numeral 129 designates an original supporting table, reference numerals $132_1$, $132_2$, $132_3$, $132_4$ and $136_1$, $136_2$, $136_3$, $136_4$ denote light-intercepting members, reference numeral 131 designates a transparent substrate on which the zone plates are provided, and reference numeral 139 denotes a substrate on which the sensor is provided. Reference numerals 130 and 135 designate a substrate on which a film forming a slit-like opening is provided and a substrate of zone plates, and further an intermediate member for unitizing the substrate of sensors by bonding. When bonding is effected through the agency of this intermediate member, the above-mentioned reference pattern for position adjustment may be used as a mark for alignment. Designated by $137_1$, $137_2$ and $137_3$ are the inverted images of the pictures or writings on the original formed on the sensors. FIG. 32C is a perspective view comprehensibly showing the construction of FIGS. 32A and B with light-intercepting plates $132_1$–$132_4$ and $136_1$–$136_2$ omitted. Reference numeral 140 designates an original, reference numeral 141 denotes a light-intercepting film for realizing the illumination of the original with a slit-like opening 143, reference numeral 142 designates an original supporting table, reference numeral 144 denotes a support member on which ommateal zone plates are provided, reference numeral 145 designates thin film sensors, and reference numeral 146 denotes a support member for the sensors. The embodiment shown in FIG. 32 is one in which a transparent protective film 119 is provided, but this protective film is not always indispensable. The protective film 119 is not restricted to a so-called thin film (made by evaporation, for example), but a sheet-like transparent member may be adhesively secured as a protective film. In the embodiment of FIG. 32, the opening for slit illumination is formed by a thin film, but other means than the evaporation method shown may also be used. For example, it may be a thin metal plate (a phosphor bronze plate subjected to a miniature working by etching) or an opaque plastic sheet. Again in the case of a thin metal plate or an opaque plastic sheet, relative position adjustment of the imaging means and the one-dimensional sensor is required, and again in such case, the position adjustment is effected with a reference pattern for position adjustment provided on the metal plate or the plastic sheet for example. However, in such case, the position adjustment cannot be effected so accurately as the patterning by the evaporated film of Cr, Al or like material and therefore, the position adjustment accuracy is poor as compared with the evaporated film. Thus, the slit width W must unavoidably be made a little greater.

Figure 33:
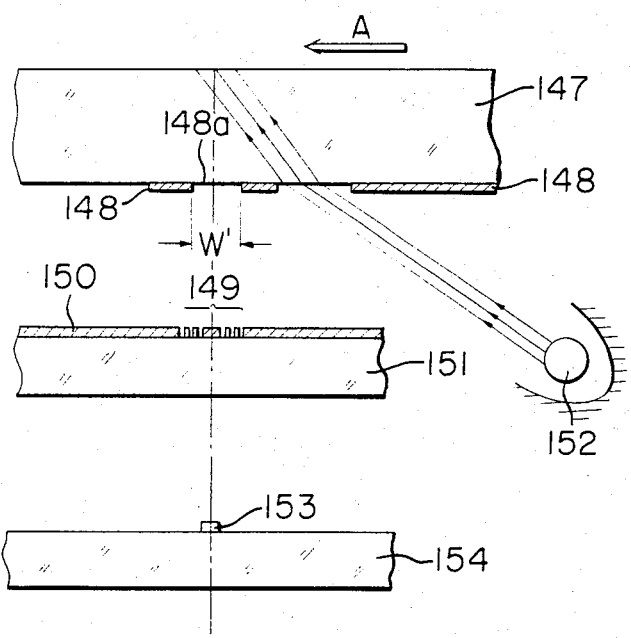

FIG. 33 shows a reading apparatus in which the slit-like opening is provided on that side opposite to the scanned surface of the original with respect to the original supporting table. In FIG. 33, reference numeral 147 designates an original supporting table formed of a transparent material, reference numeral 148 denotes an opening for controlling to a slit-like form the light passing from the original to zone plates 149, reference numeral 152 designates a light source for illuminating the original, reference numeral 150 denotes a light-intercepting film for preventing light from reaching a one-dimensional sensor 153 from the other portion than the zone plates, and reference numeral 151 designates a transparent support member on which ommateal zone plates 149 are provided. The light beam from the illuminating light source 152 impinges on the original supporting table 147 from the surface opposite to the original surface, is scattered by the original surface and is limited by the opening portion 148a of the slit 148, whereafter it is imaged on the sensor 153 by the zone plates 149.

Figure 34:
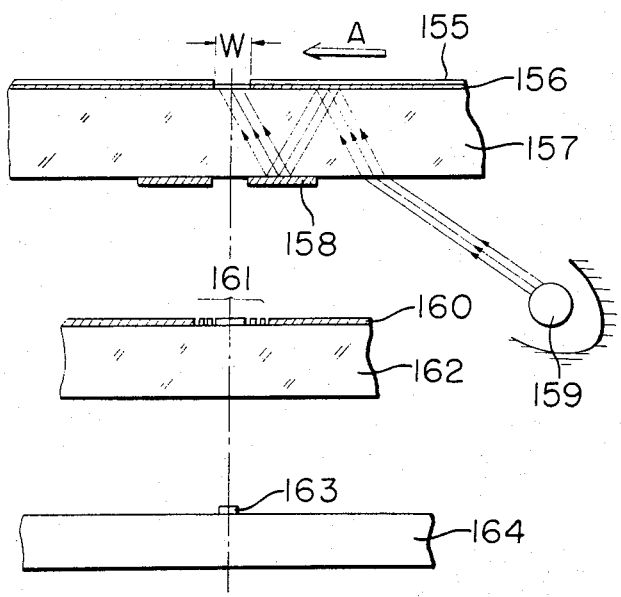

FIG. 34 shows an embodiment of the reading apparatus in which the embodiment of FIG. 32 and the embodiment of FIG. 33 are combined together. In FIG. 34, reference numeral 155 designates a film for protecting an opaque film 156 forming a slit-like opening. Reference numeral 157 denotes an original supporting table, reference numeral 158 designates an opaque film provided in the slit-like opening, reference numeral 159 denotes an illuminating light source for illuminating the original, reference numeral 161 designates ommateal zone plates, reference numeral 160 denotes an opaque film such as a metal film for intercepting the light entering a sensor 163 from the other area than the zone plates, reference numeral 162 designates a transparent substrate on which the zone plates are provided, reference numeral 163 denotes a one-dimensional sensor, and reference numeral 164 denotes a substrate on which the sensor is provided. The films 156 and 158 are also utilized as reflecting members and are used in the illuminating system. The light beam from the light source 159, after having impinged on the original supporting table, is reflected by the opaque films 156 and 158 in succession and is directed to the slitlike opening to illuminate the original. The light beam scattered by the original is limited by the opening portion 158a of the opaque film, whereafter it is imaged on the sensor 163 by the zone plates 161.

Figure 35:
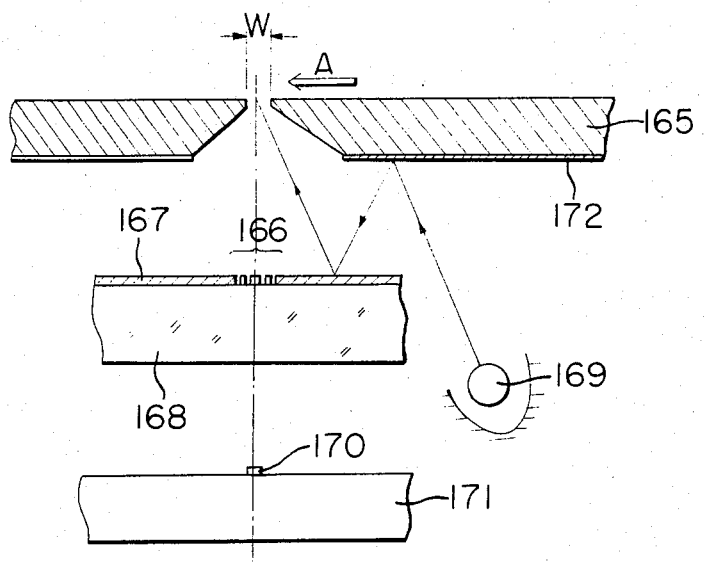

In the reading apparatus shown in FIG. 35, an original supporting table 165 is a metal plate which is formed with a slit-like opening having a slit width W so that the original may be read through this opening. Reference numeral 166 designates zone plates, and reference numeral 167 denotes an opaque film such as a metal film, and a metal film 172 provided on the original supporting table 165 and the opaque film 167 are utilized as the reflecting mirrors of the illuminating system. Reference numeral 168 designates a transparent substrate on which the zone plates are provided, reference numeral 169 denotes an original illuminating light source, reference numeral 170 designates a one-dimensional sensor, and reference numeral 171 denotes a substrate on which the sensor is provided. The light beam from the light source 169 is reflected by the metal film 172 and the opaque film 167, whereafter it is directed to the opening portion of the supporting table 165 to illuminate the original surface. The light beam scattered by the original is imaged on the sensor 170 by the zone plates 166.

Figure 36:
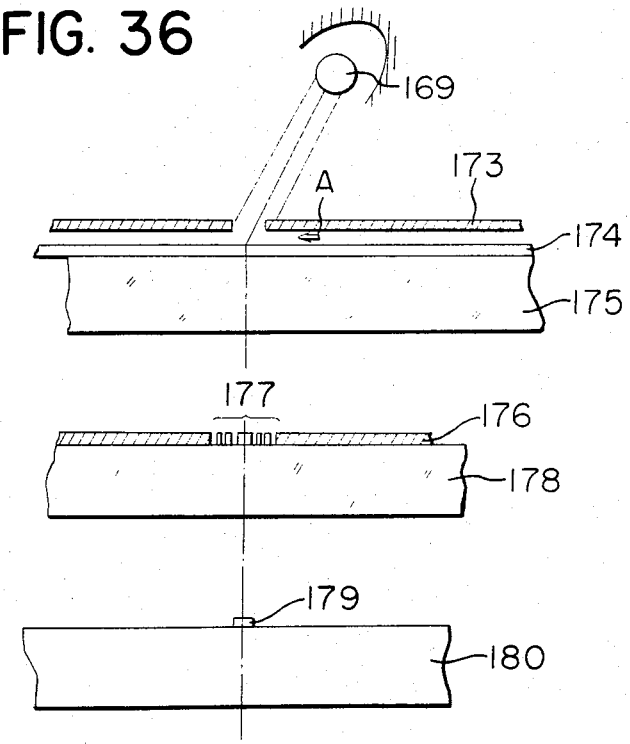

Each of FIGS. 33, 34 and 35 shows only the cross-section perpendicular to the direction A in which the original flows, but the cross-section seen in the direction in which the original flows is constituted by functions corresponding to light-intercepting plates $132_1$–$132_4$ and $136_1$–$136_4$, similarly to FIG. 32B. However, not all of the light-intercepting plates $132_1$–$132_4$ and $136_1$–$136_4$ are indispensable, but the functions corresponding to the light-intercepting plates $136_1$–$136_4$ may sometimes be omitted. Also, in FIG. 34, the light-intercepting films 156 and 158 are used as the reflecting mirrors for the illuminating light, whereas the original surface may be directly illuminated by the illuminating light source 159. Similarly, in FIG. 35, the metal film 172 provided on the original supporting member 165 and the metal film 167 for controlling the openings of the zone plates are used as the reflecting mirrors for illuminating the original, whereas these need not be utilized for the illumination but the original may be directly illuminated by the light source 169. Further, in the embodiment of FIG. 35, the metal film 172 for the reflecting mirror is provided on the original supporting member 165, whereas such metal film 172 need not be provided but the original supporting member 165 may be directly used as a reflecting mirror. FIGS. 32, 33, 34 and 35 all show a case where only one illuminating light source is employed, whereas the illuminating light source is not limited to one but two or more light sources may be employed. The one-dimensional sensor is not restricted to a thin film sensor but a solid sensor such as CCD may also be used. Any of the embodiments of FIGS. 32 to 35 is one in which the original surface is illuminated from the imaging element side and the reflected light therefrom is utilized for the imaging, whereas the present invention is applicable not only to such a method of utilizing the reflected light but also to a case where the original is illuminated from the side opposite to the imaging system (zone plates) and the light passed through the original is utilized for the imaging. In such a case, in the four embodiments shown in FIGS. 32 to 35, the illuminating light source is disposed on the side opposite to the zone plates with respect to the original. FIG. 36 shows an other embodiment than the embodiments shown in FIGS. 32 to 35 and in which the light passed through the original is utilized for the imaging. In FIG. 36, reference numeral 169 designates an illuminating light source, and reference numeral 173 denotes an opening member for illuminating an original 174 in a slit-like form. The opening member 173 is disposed adjacent to the original 174. Reference numeral 175 designates an original supporting table, reference numeral 177 denotes zone plates, reference numeral 176 designates a light-intercepting film, reference numeral 178 denotes a substrate on which the zone plates are provided, reference numeral 179 designates a one-dimensional sensor, and reference numeral 180 denotes a substrate on which the sensor is provided. In FIG. 36, the opening member 173 and the original 174 are not in contact with each other with the flow of the original taken into consideration.

In the above-described embodiments, the sensor is a one-dimensional sensor, whereas generally it is not restricted to a one-dimensional sensor but sensors arranged in a staggered fashion or two-dimensional sensors may also be employed. In that case, the original surface conjugate with the sensor with respect to the imaging system (zone plates) may be covered at the minimum and the opening for controlling the original reading surface may be set at an amount allowing for the position adjustment error with respect to the zone plates.

As described above, the imaging characteristic by zone plates depends on the wavelength band and the wavelength width and therefore, the light source used is restricted. For example, the light source is restricted to a laser producing a single wavelength, or a green fluorescent lamp, or an LED producing a light beam of a certain limited wavelength band. In the reading apparatus of the present invention shown in FIGS. 37 and 38, a wavelength band-pass filter is provided between a light source portion and a photosensor, whereby the light beam entering the photosensor from the original surface from which the image information is to be read is substantially monochromatized. Thus, even if the light source is a white light source such as a tungsten lamp or a halogen lamp, the reading accuracy will be sufficiently satisfied.

Figure 37A:
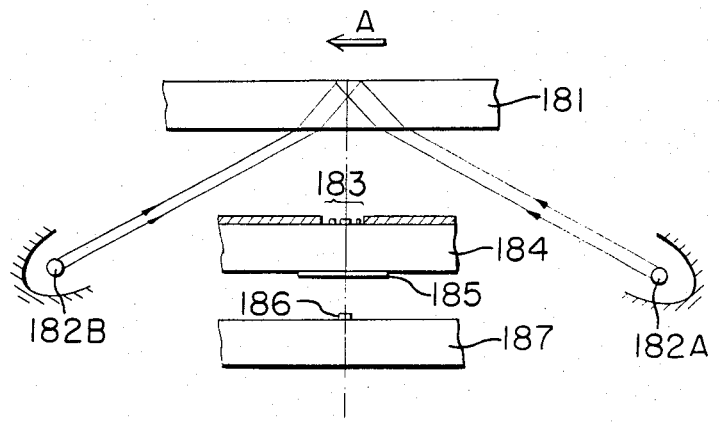
Figure 37B:
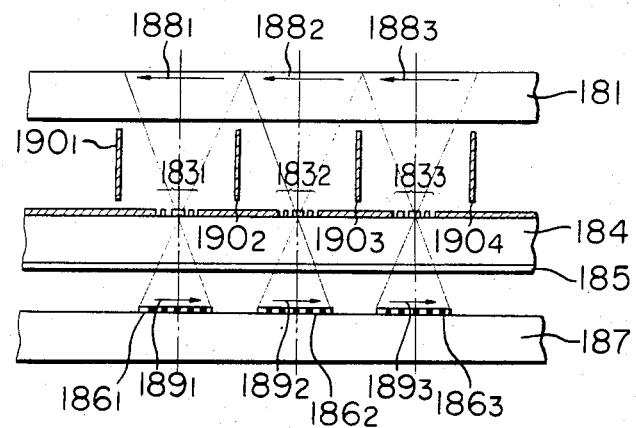

FIG. 37A is a cross-sectional view taken in a direction perpendicular to the movement direction A of the original, and FIG. 37B is a view taken in the movement direction of the original. In FIGS. 37A and B, reference numeral 181 designates an original supporting table, reference numerals 182A and 182B denote white light sources, reference numeral 183 ($183_1$, $183_2$, $183_3$) designates zone plates, reference numeral 184 denotes a substrate on which the zone plates are provided, reference numeral 185 designates a wavelength band-pass filter, reference numeral 186 ($186_1$, $186_2$, $186_3$) denotes sensors, reference numeral 187 designates a substrate on which the sensors are provided, reference numerals $188_1$, $188_2$ and $188_3$ denote pictures or writings on the original, reference numerals $189_1$, $189_2$ and $189_3$ designate the images of the original, and reference numerals $190_1$, $190_2$, $190_3$ and $190_4$ denote light-intercepting plates.

The light beams from the white light sources 182A and 183B illuminate the original $188_1$, $188_2$, $188_3$ through the original supporting table 181. The light beams reflected by the original are imaged on the photosensors $186_1$, $186_2$, $186_3$ by the zone plates $183_1$, $183_2$, $183_3$. A filter 185 is provided between the zone plates and the photosensors to make the light beam entering the photosensors into a light beam having a desired wavelength characteristics.

Figure 38:
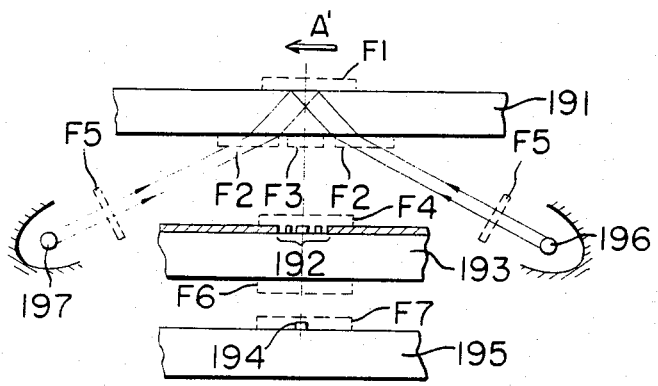

FIG. 37 shows an example of the case where the wavelength band-pass filter is provided on that side of the zone plate substrate opposite to the surface on which the zone plates are provided, but generally the wavelength band-pass filter may be provided anywhere between the light sources and the sensors. FIG. 38 shows the arrangement of the wavelength band-pass filter which would usually occur to mind. In FIG. 38, F1, F2, F3, F4, F5, F6 and F7 are the positions at which a wavelength band-pass filter can possibly be disposed, and a wavelength band-pass filter may be provided at at least one of these positions. These arrangements will now be described in detail. F1 is an example in which the filter is provided on the original supporting table 191 and on that side thereof which is adjacent to the original surface. F2 is an example in which the filter is provided on the original supporting table 191 and in the optical path before the illuminating lights from the light sources 196 and 197 impinge on the original. F3 is an example in which the filter is provided on the original supporting table and in the optical path in the cource of the light passing from the original to the zone plates 192. F4 is an example in which the filter is provided on the substrate 193 of the zone plates 192 and on that side thereof on which the zone plates lie. F5 is an example in which the filter is provided in the optical path between the light source and the original supporting table. F6 is an example in which the filter is provided intermediate of the zone plates 192 and the sensors 194 and accordingly, not on the surface on which the zone plates are provided nor on the surface on which the sensors are provided. F7 is an example in which the filter is provided on the substrate 195 of the sensors and on that surface thereof on which the sensors are provided.

In the reading apparatus shown in FIGS. 37 and 38, even if the light sources are white light sources such as tungsten lamps or halogen lamps, the imaging characteristic of the zone plates will be satisfied if the light passing to the sensors is substantially monochromatized as by inserting a wavelength band-pass filter in the course from the light source of the reading system to the sensors. Also, what wavelength is to be selected for the white light is determined by the design of the wavelength band-pass or the reflecting filter and not by the light source such as a green fluorescent lamp or LED and thus, designing with various free wavelength characteristics becomes possible. The merits of the provision of a wavelength band-pass filter in the course of the reading system will be enumerated below.

(i) The imaging characteristic of the zone plates depends on the band width of the wavelength band, and this band width can be set to a desired size by the designing of the filter.

(ii) The zone plates comprise a fine pattern of thin film and the wavelength band-pass filter also comprises a thin film and therefore, both of them can conveniently be made by similar manufacturing techniques.

(iii) The wavelength of monochromatic light can be freely changed and set.

Figure 39A:
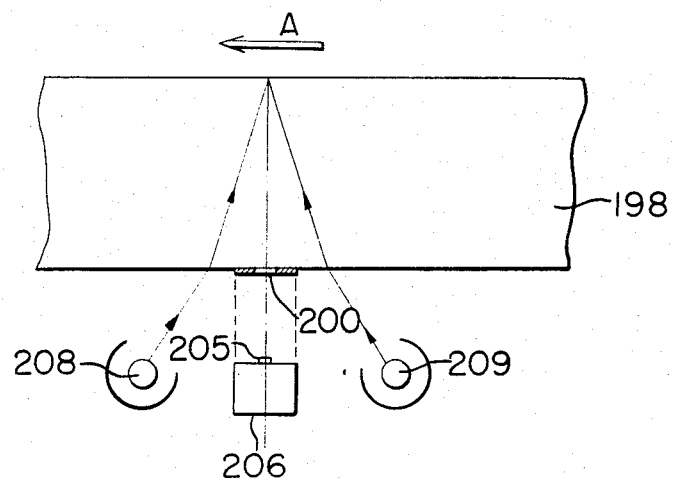
Figure 39B:
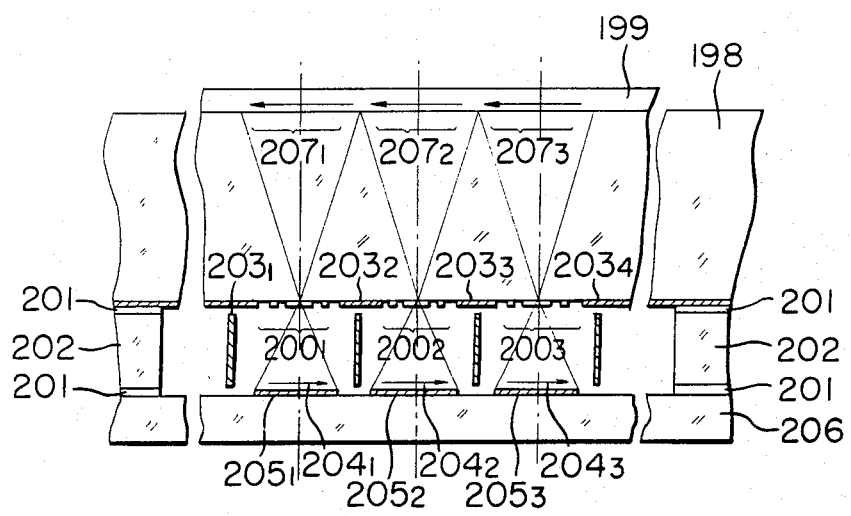

The embodiments of the reading apparatus according to the present invention shown in FIGS. 39 and 40 are ones in which zone plates are provided on one of the surfaces of the original supporting table, and are compact apparatus which satisfy severe position adjustment accuracy of the imaging system and which are suitable for mass production. FIG. 39A shows a surface parallel to the movement direction of the original as indicated by arrow A, and FIG. 39B shows a surface perpendicular to the movement direction of the original. In FIG. 39A, reference numeral 198 designates a transparent member which is an original supporting table and also a substrate of a zone plate row 200, reference numeral 205 denotes a sensor row, reference numeral 206 designates a substrate of the sensors, and reference numerals 208 and 209 denote light sources. As shown, the zone plates which are an imaging system are provided on the transparent member which serves also as the original supporting table. In FIG. 39B, reference numeral 199 designates an original, reference numerals $207_1$, $207_2$ and $207_3$ denote pictures or writings depicted on the original 199, reference numeral 198 designates a transparent member which is an original supporting table and also a substrate of a zone plate row 200, reference numerals $200_1$, $200_2$ and $200_3$ denote zone plates having the function of causing the images $204_1$, $204_2$ and $204_3$ of the pictures or writings $207_1$, $207_2$ and $207_3$ to be formed, reference numerals $203_1$, $203_2$, $203_3$ and $203_4$ designate light-intercepting plates for intercepting the light from the other portion than the desired area of the original and the other light than the diffraction order of diffracted light which is concerned in the imaging, of the diffracted light of the zone plates, reference numerals $205_1$, $205_2$ and $205_3$ designate sensors, and reference numeral 206 denotes a substrate on which the sensors are provided. Also, reference numeral 202 designates a solid spacer provided to unitize the zone plates and the sensors through an adhesive layer 201 to effect the positioning between the imaging system 200 and the sensors $205_1$, $205_2$, $205_3$. The position adjustment of the zone plates and sensors may be accomplished by patterning position adjustment marks on each substrate in advance when the substrate 198, the spacer 202 and the sensor substrate 206 are adhesively secured to one another, and effecting alignment-adhesion with them as the reference.

If the zone plates are provided on the original supporting table as shown in FIG. 39, the distance between the zone plates and the original may be preset by the thickness of the original supporting table, and it will become unnecessary to adjust the spacing between the original surface and the zone plate surface during assembly as required in the case of the construction as shown in FIG. 3 or to unitize the original supporting table and the substrate of the zone plates by adhesively securing them together through an intermediate member whose thickness is accurately set.

Figure 40A:
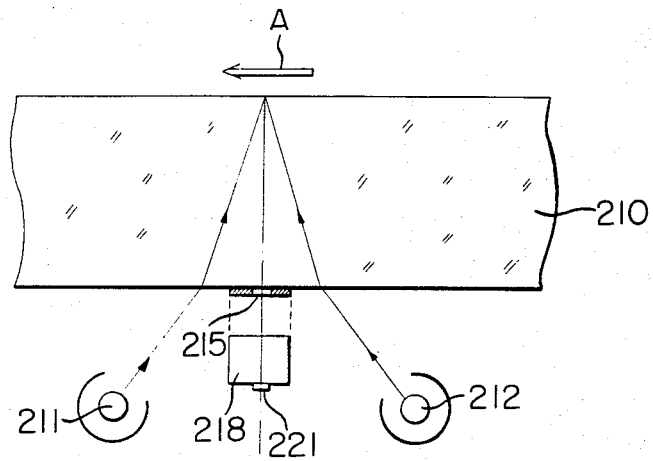
Figure 40B:
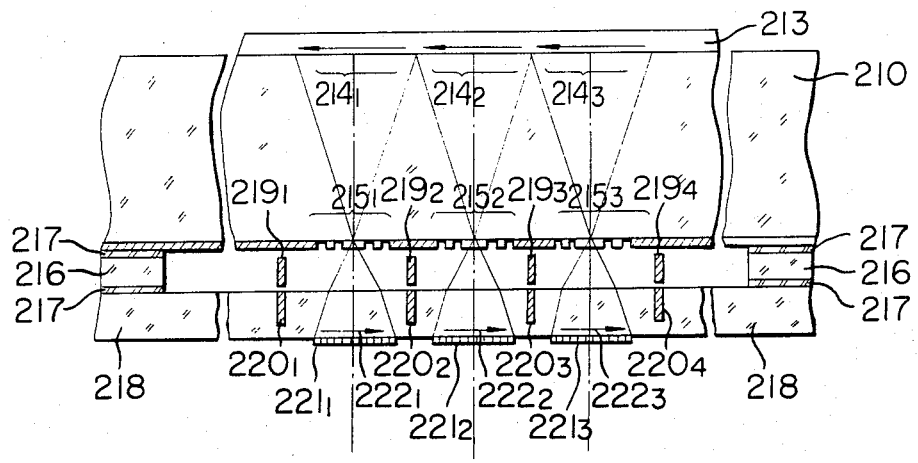

FIG. 40A shows another embodiment of the reading apparatus according to the present invention. FIG. 40A shows a surface parallel to the movement direction of the original, and FIG. 40B shows a surface perpendicular to the movement direction of the original. In FIG. 40A, reference numeral 210 designates a transparent member which is an original supporting table and also a substrate of a zone plate row 215, reference numeral 221 denotes a sensor row, reference numeral 218 designates a substrate of the sensors, and reference numerals 211 and 212 denote light sources. In FIG. 40B, reference numeral 213 designates an original, reference numerals $214_1$, $214_2$ and $214_3$ denote pictures or writings depicted on the original surface, reference numeral 210 designates a transparent member which is an original supporting table and also a substrate of the zone plate row 215, reference numerals $215_1$, $215_2$ and $215_3$ denote zone plates for causing the images $222_1$, $222_2$ and $222_3$ of the pictures or writings $214_1$, $214_2$ and $214_3$ to be formed, and reference numerals $219_1$, $219_2$, $219_3$, $219_4$ and $220_1$, $220_2$, $220_3$, $220_4$, respectively designate light-intercepting plates and light-intercepting grooves for intercepting the light from the other portion than the desired area of the original and the other light than the diffraction order of diffracted light which contributes to the imaging, of the diffracted light of the zone plates. The light-intercepting grooves $220_1$, $220_2$, $220_3$ and $220_4$ are provided in the substrate 218 of the sensors and are adapted to cut any light obliquely entering thereinto. Reference numerals $221_1$, $221_2$ and $221_3$ designate sensors, and reference numeral 216 denotes a spacer provided to unitize the zone plates and the sensors through an adhesive layer 217 to effect the positioning between the imaging system 215 and the sensors $221_1$, $221_2$, $221_3$. The positioning between the zone plates and the sensors may be accomplished by providing alignment reference marks on each substrate and the spacer before the adhesion as in the embodiment of FIG. 39.

Thus, by using the construction as shown in FIGS. 39 and 40, simplification of parts or labor-saving during assembly necessary for accurately effecting the setting of the spacings between the original supporting table and the zone plate substrate and the sensor substrate can be achieved.

A case where the reading apparatus of the present invention is applied to the reading of colored originals will now be shown. The colored original reading apparatus of the present invention may be formed by arranging a plurality of ommateal optical systems formed by the zone plates, correspondingly to the number of wavelengths to be read. That is, a unit reading element is formed by a zone plate and a sensor, and a plurality of such unit reading elements are arranged, thereby forming a reading optical system for reading one scanning line on a scanned surface. Each unit reading element can only read a very much limited portion of the scanned surface, but by arranging a plurality of such unit reading elements in series, an area corresponding to one scanning line to be read on the scanned surface is covered. The color information of the scanned surface is read by arranging, in parallel, a plurality of one scanning line reading optical systems each formed by an aggregation of such unit reading elements, correspondingly to the number of types of information on the wavelengths to be read.

Figure 41A:
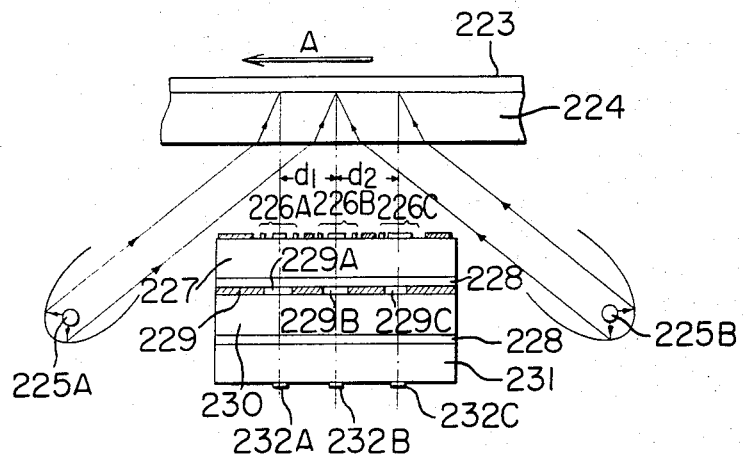
FIGS. 41(A) and 41(B), 42 and 43 show the reading apparatus of the present invention as applied to the color reading.
Figure 41B:
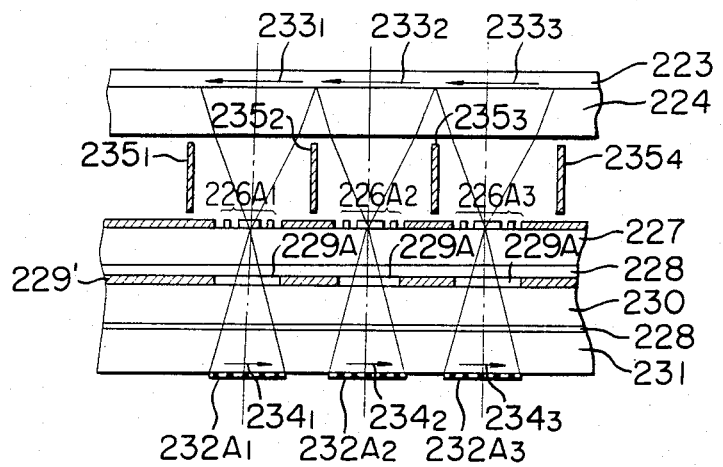
Figure 42:
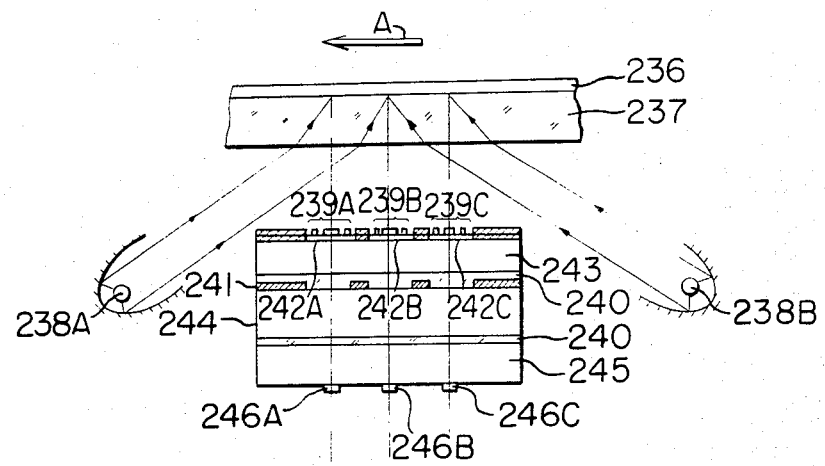
Figure 43:
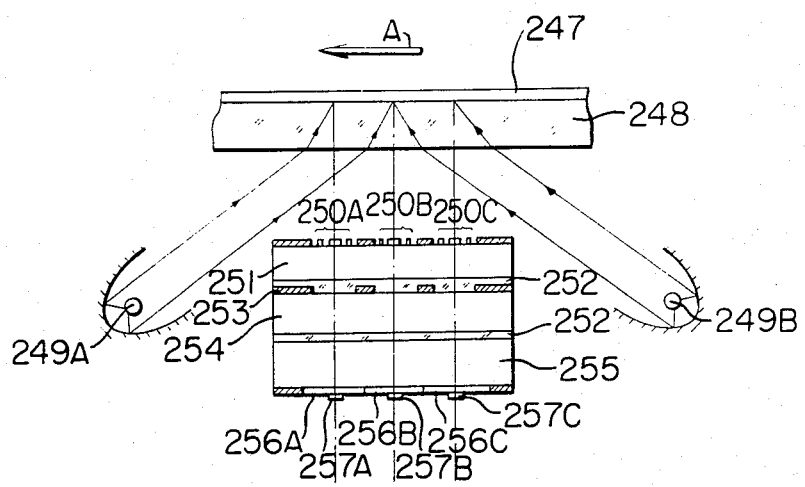

FIGS. 41, 42 and 43 each show a color reading apparatus. In FIG. 41A, reference numeral 223 designates an original, reference numeral 224 denotes an original supporting table, and reference numerals 225A and 225B designate light sources which may be white light sources such as, for example, halogen lamps. The original is fed in a direction indicated by arrow A and the original images are successively read in a slit-like area long in the direction perpendicular to the plane of the drawing sheet. In the movement direction of the original, there are imaging systems 226A, 226B and 226C comprising three rows of zone plates, and the respective rows are adapted to read color information of blue, green and red. Reference numeral 227 designates a glass substrate on which the zone plates are provided, reference numeral 231 denotes a glass substrate on which thin film sensors such as amorphous silicon are provided, and reference numerals 229A, 229B and 229C designate band-pass filters provided on a glass substrate 230 which pass blue wavelength, green wavelength and red wavelength, respectively. Designated by 232A, 232B and 232C are thin film sensor rows provided on the image plane of the original by the zone plates 226A, 226B and 226C. Reference numeral 228 designates adhesive layers by which the imaging system, the band-pass filters and the thin film sensors are secured together in the embodiment of FIG. 41A. In this case, unless the glass substrates 227, 230 and 231 are adhesively secured to one another in a condition in which they are position-adjusted with accuracy of about $20\mu$ or less, the image formation of the entire original will not be successfully accomplished. The position adjustment and adhesion with accuracy of 20μ or less may be easily accomplished by providing position an adjustment mark on each substrate in advance by evaporation and adhesively securing the substrates together with this mark as the reference. Reference numeral 229' designates a mask for intercepting the other light than the light which originally enters the sensor row 232A, for example, by the zone plate 226A, namely, the light entering the sensor row 232A through the openings of the zone plates 226B and 226C, the mask 229' being made by evaporating an opaque film such as a metal film. Also, the zone plates, the wavelength band-pass filters and the thin film sensors are all made by the evaporation and the patterning using photoetching, and these techniques are already established as one of the manufacturing steps for IC or LSI.

Accordingly, the reading optical system comprising such a construction is suitable for mass production. The wavelength band-pass filters 226A, 226B and 226C can be designed and fabricated by suitably adjusting the wavelength band width in accordance with the number of annular zones of the zone plates and the degree of sensitivity of the thin film sensors and in conformity with the desired imaging performance. The radii and number of annular zones of each zone plate row must be designed correspondingly to each wavelength and, as previously described, when the focal length is f and the wavelength is λ, the radius $\gamma m$ of the mth annular zone is generally given by $\gamma m = \sqrt{f \times \lambda \times m}$.

FIG. 41B is a view of the zone plate row 226A and sensor row 232A in FIG. 41A which read a wavelength range, for example, the blue wavelength, as seen from a direction contained in the plane of the drawing sheet of FIG. 41A. In FIG. 41B, reference numerals $233_1$, $233_2$ and $233_3$ designate the original pictures on the original, and reference numerals 226A, 226B and 226C denote zone plates which are all equally dimensioned. The wavelength band-pass filter layers are all of the same film construction and correspond to the filter 229A of FIG. 41A. Reference numerals $232A_2$, $232A_1$ and $232A_3$ denote thin film sensors provided at the image plane positions of the original pictures $233_1$, $233_2$ and $233_3$ formed by the zone plates $226A_1$, $226A_2$ and $226A_3$, respectively. Reference numerals $235_1$, $235_2$ and $235_3$ designate light-intercepting plates for intercepting any light coming from the other areas than a predetermined area of the original. In the above-described arrangement, where slit-like images read by each row in accordance with the wavelength band row are time-serially taken out as electrical signals and supplied to a display device, and assuming that in FIG. 41A, the spacings between the object rows on each original surface are $d_1$ and $d_2$ and the movement velocity of the original is v mm/sec., the color information on the original surfaces can be displayed while being spatially arranged properly if the electrical signals by 232C and 232B are taken out with respective time delays of $(d_1+d_2)/v$ sec. and $d_1/v$ sec. with respect to the electrical signals by 232A. Also, the sensor rows 232A, 232B and 232C respectively take out the color information of blue, green and red and therefore, by superposing these electrical signals one upon another or by subtracting them one from another, faithful color reproduction can be realized. For example, the above-described electrical signals may be directed to the input systems of blue, green and red inks by ink jet. In the embodiment of FIG. 41, the wavelength band-pass filters are provided between the zone plate rows and the sensor rows and moreover, on a substrate discrete from the zone plate substrate and the sensor substrate, whereas actually such arrangement is not restrictive but the filters may be provided on the substrate of the zone plate rows or the substrate of the sensor rows. In the embodiment of FIG. 41A, the order in which light passes in the original→the zone plates→the wavelength band-pass filters→the sensors, but the wavelength band-pass filters may be provided anywhere between the original and the sensors. As regards the dimension of the filters of FIG. 41A, they can be constructed at about $d_1 \simeq d_2 \simeq 5$ mm and this means a very compact construction. The zone plates 226A, 226B and 226C may be either the amplitude type zone plates as shown in FIG. 4 or the phase type zone plates as shown in FIG. 5. In any case, the other surface than the effective opening surface of each zone plate is provided with an opaque film such as a metal film. Also, in the embodiment of FIG. 41, the substrates of zone plates, wavelength band-pass filters and sensors are discrete and unitized by adhesion, but generally the respective substrates may be separate from one another or two types of substrates among the above-described function elements may be unitized. As a further alternative, both zone plates and wavelength band-pass filters may be provided on one and the same substrate or both sensors and band-pass filters may be provided on one and the same substrate.

FIG. 42 shows a case where zone plate layers and wavelength band-pass filters are provided in superposed relationship on one and the same substrate. In the embodiment of FIG. 42, reference numeral 236 designates an original, reference numeral 237 denotes an original supporting table, reference numerals 239A, 239B and 239C designate zone plate rows for imaging on color information sensors 246A, 246B and 246C, respectively, and reference numerals 242A, 242B and 242C designate wavelength band-pass filters provided on a substrate 243 on which the zone plates are provided. Designated by 240 are adhesive layers.

FIG. 43 shows an embodiment in which sensor rows and wavelength band-pass filters are provided in superposed relationship on one and the substrate. In FIG. 43, reference numeral 247 designates an original, reference numeral 248 denotes an original supporting table, reference numerals 250A, 250B and 250C designate zone plate rows for imaging respective color information on sensors 257A, 257B and 257C, and reference numerals 256A, 256B and 256C denote wavelength band-pass filters provided on a substrate 255 on which the sensors are provided. Reference numeral 252 designates adhesive layers, and reference numeral 253 denotes a mask for intercepting the light passing from the other area than a predetermined area of the original to the sensor surface.

In the embodiments of FIGS. 41, 42 and 43, the wavelength zones to be detected are shown as three types, namely, blue, green and red, but the color zones may be two types or four or more types. In that case, zone plate rows and sensor rows may be provided in conformity with the number of color zones. In the embodiments, the sensors are shown as thin film sensors, but generally solid sensors such as CCD may also be employed.

Figure 44A:
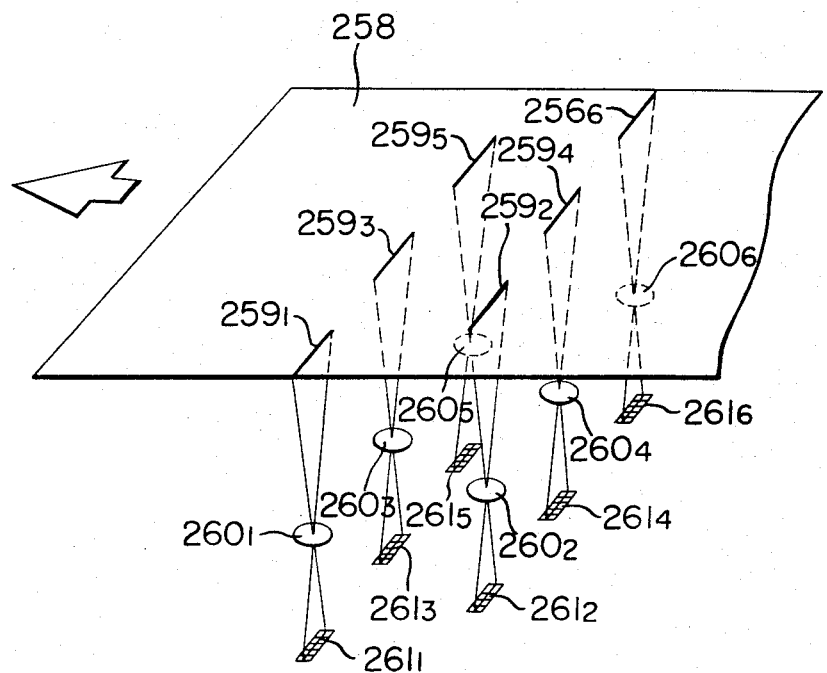
FIGS. 44(A) and 44(B) and 45 show the reading apparatus of the present invention which are arranged in a staggered fashion.
Figure 44B:
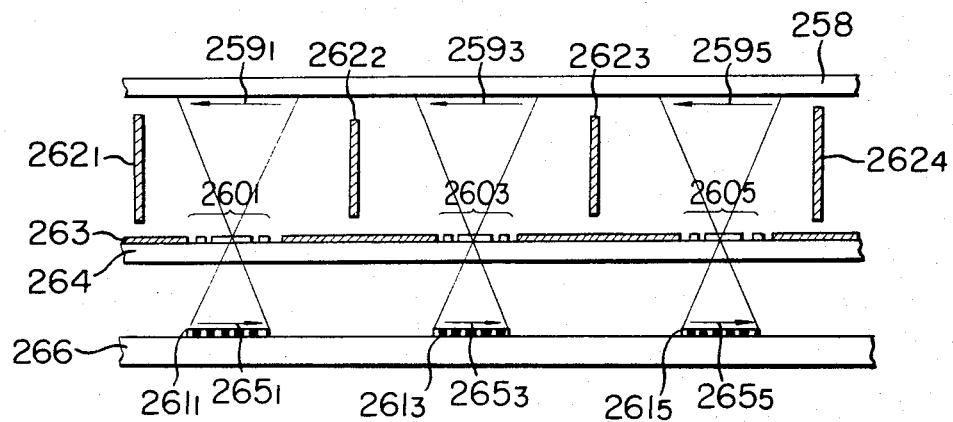

The above-described embodiments of the reading apparatus have been shown with respect to a case where the original surface is read in a line form, and description will now be made of embodiments in which the original surface is read in a staggered fashion. FIGS. 44A and B show an embodiment of the apparatus in which the original surface is read in a staggered fashion, FIG. 44A being a schematic perspective view of the reading apparatus in which zone plates and sensors are arranged in two staggered rows. In FIGS. 44A and B, reference numeral 258 designates an original, reference numerals $259_1$–$259_6$ denote parts of a picture or writing depicted on the original, reference numerals $260_1$–$260_6$ designate zone plates, and reference numerals $261_1$–$261_6$ denote sensors. Arrow A indicates the direction in which the original is moved. FIG. 44B shows planes containing odd zone plates and sensors, of the cross-sections perpendicular to the movement direction of the original in FIG. 44A. In FIG. 44B reference numerals $262_1$–$262_4$ designate light-intercepting means, reference numeral 263 denotes a light-intercepting film-like medium, reference numeral 264 designates a substrate on which zone plates are provided, reference numerals $265_1$, $265_3$ and $265_5$ denote the images, on the sensor surface, of the parts $259_1$, $259_3$ and $259_5$ of the picture or writing depicted on the originals, and reference numeral 266 denotes a substrate on which sensors are provided. In FIG. 44A, signals of even sensors such as $261_2$, $261_4$, ... are delayed and added to signals of odd sensors $261_1$, $261_3$, ... and detected as the reading signals of right one line of the original 258 and supplied, for example, to a recording apparatus. Alternatively, where the recording apparatus is provided with a staggeredly arranged output thermal head or ink jet head corresponding to the zone plate array and sensor array the reading signals are directly supplied to the recording apparatus, whereby the signals are recorded in the order of reading.

In the case of the example shown in FIGS. 44A and B, there are the following merits. (i) The sum of the manufacturing accuracy and alignment accuracy required of the light-intercepting means $261_1$–$261_4$ may be about the size of the visual field on the original surface allotted to a zone plate. Where one line of the original surface is to be read at a time, accuracy lower by one unit than the size of the visual field on the original surface allotted to a zone plate has been required. (ii) Accordingly, the manufacture of the light-intercepting means becomes easier and the size of the visual field on the original surface allotted to a zone plate can be made smaller than in a case where one line is read at a time. The effective diameter of the zone plate corresponding to such visual field on the original surface and the distance between the original surface and the image plane, namely, the total conjugate, can be made smaller and this contributes to compactness of the reading apparatus. (iii) As regards the imaging magnification of the zone plates, one-to-one magnification also becomes possible. Although FIG. 44 is not one-to-one magnification imaging, the arrangement accuracy of the light-intercepting means becomes loose as shown in FIG. 44B and a wide insensitive portion exists between a sensor and a sensor, and this eliminates the necessity of providing any light-intercepting means in the space intermediate a sensor and a zone plate. Where one line of the original surface is to be read at a time, it is necessary due to the necessity of intervention of the light-intercepting means that an insensitive portion be provided between adjacent sensors which receive the image created by adjacent zone plates, and this has made one-to-one magnification imaging difficult. If the size of one bit of a sensor is constant, one-to-one magnification imaging will preferably be higher in the spatial frequency capable of reading on the original surface than reduced-scale imaging. (iv) Construction is possible even if the effective diameter of each individual zone plate is greater than the diameter of the object view field allotted to a zone plate, and accordingly the effective F-No. of the zone plate can be made smaller, that is, the imaging system can be made brighter.

Figure 45:
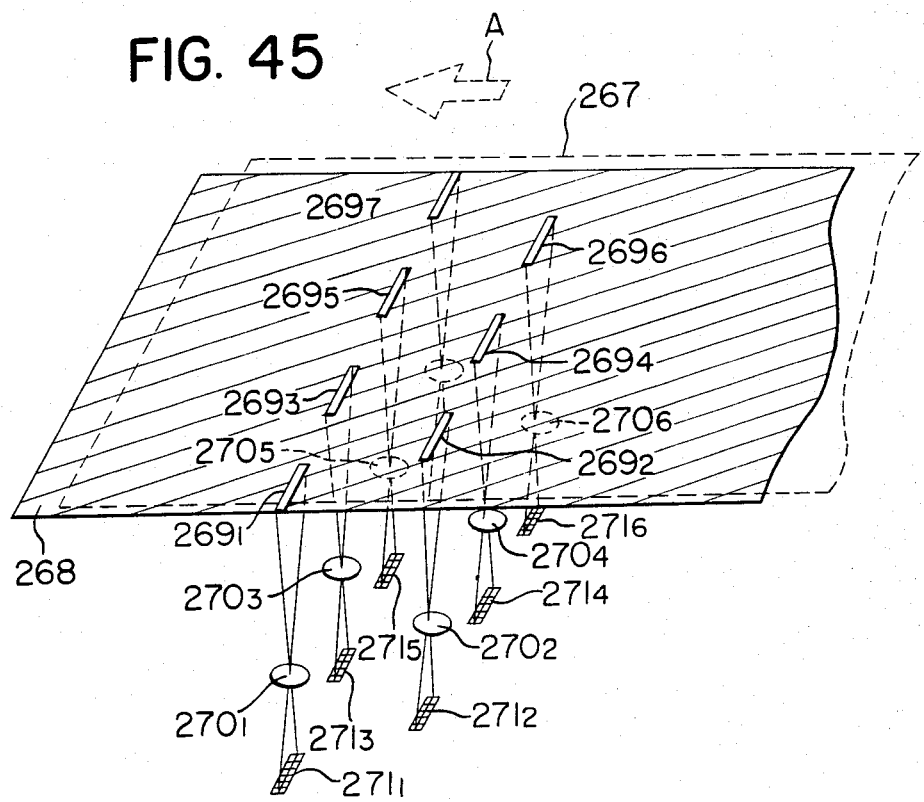

FIG. 45 shows another embodiment of the apparatus in which the original surface is read in a staggered fashion. In this embodiment, reading is effected with the original surface to be read being confined to the aforementioned slitlike opening. In this case, the S/N ratio of the light arriving at the sensor surface is improved as previously described.

In FIG. 45, reference numeral 268 designates a light-intercepting member provided on an original supporting table and having a slit-like opening, reference numeral 267 denotes an original, and a broken-line arrow A indicates the direction in which the original is moved. The hatching represents a light-intercepting portion. Reference numerals $269_1$–$269_6$ designate openings through which light passes in a slit-like form, reference numerals $270_1$–$270_6$ denote zone plates, and reference numerals $271_1$–$271_6$ designate sensors. As shown in FIG. 45, the slit-like openings, zone plates and sensors are all made by patterning such as photoetching, and the mutual positioning thereof can be accomplished comparatively easily by providing in advance position adjustment patterns in the patterns on the substrate on which the zone plates are provided, the substrate on which the sensors are provided and the original supporting table.

Figure 46A:
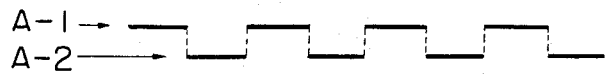
FIGS. 46(A) and 46(B) show the manner in which zone plates and sensors are arranged in a staggered fashion.
Figure 46B:
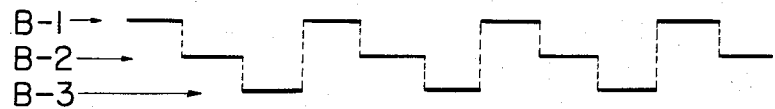

FIGS. 44 and 45 are shown as an arrangement like reduced-scale imaging, but of course, one-to-one magnification may also be used without any inconvenience. Also, FIGS. 44 and 45 show a two-row staggered arrangement, but generally three or more rows may also be adopted. Examples of these arrangements are shown in FIG. 46. In FIGS. 46A and B, the positions on the original surface which are being read are indicated by thick lines, and FIG. 46A shows the case of a two-row staggered arrangement and FIG. 46B shows a three-row staggered arrangement. In the case of the three-row arrangement, the areas on each row which are not being read are wider and this means that the insensitive area on the sensor surface is wider. Again in the three-row arrangement, signals of the sensors on the same row may be delayed and added to signals of the sensors on the reference row (the reference row with respect to the delay time) and taken out as the signals of right one line of the original.

Description will now be made of an adjusting method which causes alignment of such zone plates and sensors in micron order. The position adjusting method adopted in the present invention comprises providing a zone plate on one of a first flat surface on which zone plates are provided and a second flat surface on which photosensors are provided, providing another surface at a position whereat, of the diffracted lights created when a parallel light beam enters said zone plate, a predeterminmed diffracted light forms an airy spot, or a position whereat the image of the airy spot is formed, providing a mark of a required shape at the position whereat the airy spot or the image thereof is formed, observing the quantity of light in which the predetermined diffracted light of the Fresnel zone passes through or is reflected by the mark, thereby effecting the position adjustment of the first flat surface and the second flat surface.

Where the airy disc of the predetermined diffracted light by the zone plates provided on the first flat surface is to be formed on the required mask provided on the second flat surface, +1st-order diffracted light is used in the embodiment shown below, but higher order positive diffracted light may also be used. In such case, there occurs an inconvenience that as the order is higher, the quantity of diffracted light becomes smaller, but the alignment accuracy is improved in the present invention wherein the diameter of the airy disc formed on the second flat surface can be made smaller and the alignment accuracy can be provided by the size of the diameter of the airy disc.

Negative diffracted light can also be used, but in this case, the image cannot be formed only by the diffracting action of the zone plates and therefore, there is required the trouble that the negative diffracted light from the zone plates must be passed through an imaging means for converging such light and then be condensed on a required pattern.

Figure 47:
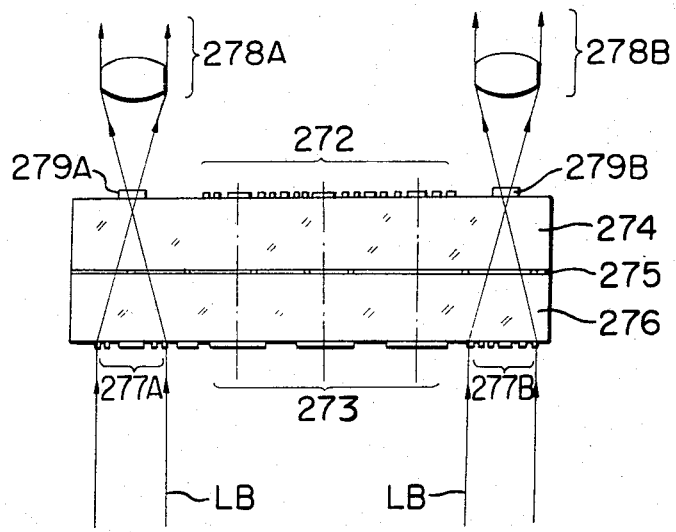
FIGS. 47, 48, 49 and 50 illustrate the manner in which position adjustment of two different flat surfaces is effected by the use of position adjusting zone plates.
Figure 48:
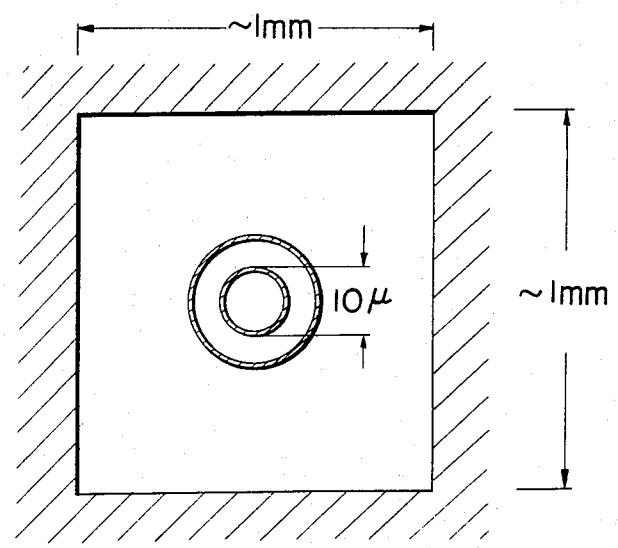

FIG. 47 stows an arrangement for highly accurately position-adjusting the mutual patterns of a flat substrate on which thin film sensors represented by amorphous silicon or the like are provided and a flat substrate on which a thin film-like imaging system comprising ommateal zone plates is provided. In FIG. 47, reference numeral 272 designates a thin film imaging system comprising ommateal zone plates, reference numeral 273 denotes a pattern of thin film sensors represented by amorphous silicon or the like, reference numerals 274 and 276 designate flat substrates, reference numeral 275 denotes an adhesive layer, and reference numerals 277A and 277B designate zone plates provided for position adjustment, and the plane wave of He-Ne laser enters perpendicularly to the underside of the substrate 276. Reference numerals 279A and 279B designate marks for position adjustment with the spots of laser beams created by the zone plates 277A and 277B, and since the patterns of the sensor 273 and the imaging system 272 are made by the technique of photolithography, the mutual positions of the marks 279A and 279B for position adjustment on the surfaces on which the zone plates 277A and 277B for position adjustment and the imaging system 272 are provided are accurately preset when an original mask used in photolithography is made. Designated by 278A and 278B are observation optical systems for observing therethrough the condition of adjustment between the spots (intensity distributions of light) formed at the focuses of the zone plates 277A and 277B and the alignment reference mark. When a laser beam such as He-Ne is applied perpendicularly to the zone plates 277A and 277B, +1st-order diffracted light diffracted by the zone plates had its airy pattern formed on the marks for position adjustment. As is well known, this airy pattern is given by $\gamma A = 1.22 \cdot F\lambda$ where $\gamma A$ is the radius of the airy pattern, F is F-number, and $\lambda$ is wavelength. For example, when the F-number of the position adjusting zone plate is set to 5 and $\lambda$ is set to 0.6328, $\gamma A = 3.86\mu$. The position adjusting zone plate is not restricted to an amplitude type zone plate, but may also be a phase type zone plate. An embodiment of the mask for position adjustment is shown in FIG. 48. In FIG. 48, the hatching indicates a portion which does not pass light therethrough, and the remainder is a portion which passes light therethrough. Position adjustment is effected by means of the observation optical system so that the airy disc is contained in the central small circle. By doing so, position adjustment on the order of the diameter of the airy disc, namely, the order of $8\mu$–$10\mu$, is possible.

This position adjustment is not always restricted to the position adjustment of flat surfaces provided parallel to each other, but is also applicable to the position adjustment of flat substrates whose surfaces are not parallel.

Figure 49:
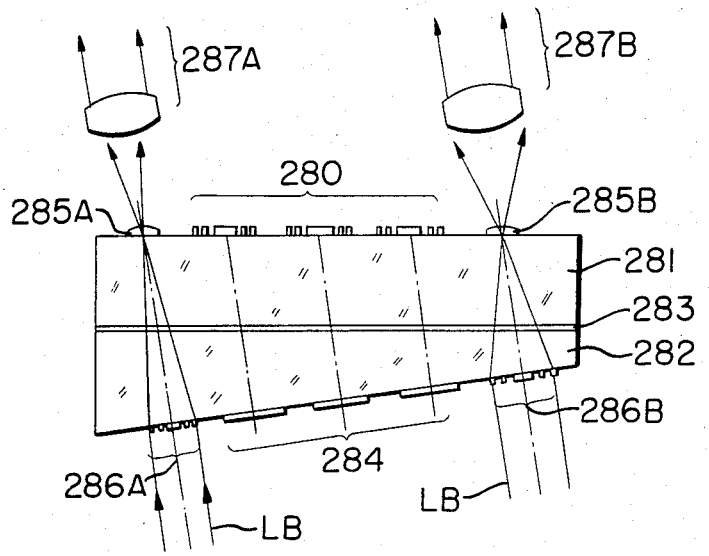

Such an embodiment is shown in FIG. 49. In FIG. 49, reference numeral 280 designate a thin film-like imaging system comprising ommateal zone plates, reference numeral 281 denotes a parallel substrate on which the thin film-like imaging system is provided, reference numeral 283 designates an adhesive layer, reference numeral 284 denotes thin film-like sensors, and reference numeral 282 designates a substrate on which the thin film-like sensors are provided. The opposite surfaces of the substrate 282 are not parallel to each other. Reference numerals 286A and 286B designate zone plates for position adjustment, reference numerals 285A and 285B denote marks for position adjustment, and reference numerals 287A and 287B designate observation optical systems for observing therethrough the condition of adjustment between the spots formed at the focuses of the zone plates 286A and 286B and alignment reference marks 285A and 285B. The zone plate 286A has a focal length longer than that of the zone plate 286B and, with the thicknesses of the substrates 282 and 281 taken into account, design is made such that the airy patterns of the zone plates 286A and 286B are formed on the marks 285A and 285B for position adjustment, respectively.

The above-described position adjusting method is applicable if the surfaces are flat and therefore, it is also useful for the position adjustment of a refractive index distribution type flat microlens array or the like.

Figure 50:
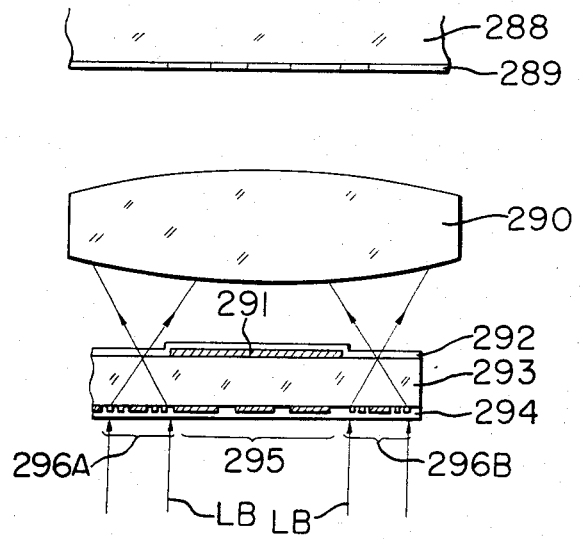

FIG. 50 shows an embodiment for matching the optical axes of opposed microlenses with each other when the microlens arrays are provided on the opposite sides of a substrate. A refractive index distribution type microlens may be made usually by providing a mask pattern on a transparent substrate glass and effecting ion exchange in the substrate glass relative to the flat glass surface not covered with the mask pattern. Accordingly, the embodiment shown in FIG. 50 is for providing a mask pattern on each side of the substrate glass in aligned relationship.

FIG. 50 is for illustrating a method whereby position adjustment is effected when the opposite surfaces of the same flat substrate having an array-like mask pattern already provided on one surface thereof are subjected to patterning. In FIG. 50, reference numeral 288 designates a substrate of an original mask, reference numeral 289 denotes a surface of the original mask, and reference numeral 290 designates a pattern printing imaging system. Reference numeral 293 designates a substrate on which a microlens array is to be provided, and an array-like pattern 295 and zone plates 296A and 296B used for position adjustment are already provided on one surface (underside) of the substrate 293, and reference numeral 294 denotes a photoresist film. Designated by 291 is a film of Ti, the surface of which is to be subjected to patterning by printing and etching. Denoted by 292 is also a photoresist film. When, as shown in FIG. 50, the plane waves LB of He-Ne laser impinge on the pupils of the zone plates 296A and 296B perpendicularly to the underside of the substrate 293, spots of airy disc are formed on the surface on which the photoresist 292 lies. The surface on which the photoresist 292 lies and the original mask surface 289 are conjugate with respect to the pattern printing imaging system 290, and the spot of the laser beam formed by the zone plates 296A and 296B is imaged on the surface of the original mask 289 through the imaging system 290, and by effecting the position adjustment of the original mask 289 and the flat substrate 293 with this spot as the reference, the position of the pattern of the Ti film 291 relative to the pattern 295 can be set highly accurately at the same degree of dimension error as the spot diameter. A position adjusting mark for the spot of the laser beam them imaged on the original mask surface 289 is provided on the original mask 289 in advance.

What I claim is:

1. An apparatus for reading an original surface, comprising:
   supporting means for supporting the original surface;
   a plurality of unit reading optical systems each for reading a respective part area of the original surface, each of said unit reading optical systems having a zone plate and a photosensor means provided at a position whereat diffracted light of at least one predetermined order from the corresponding one of said zone plates is condensed and focused to form an image of the corresponding part area of the original surface, said unit reading optical systems being arranged in a predetermined array to read the entire area of the original surface; and
   light intercepting means disposed between said zone plate and said photosensor means of each said unit reading optical system to block entry into said photosensor means of a light beam directed from said zone plate of an adjacent one of said unit reading optical systems.

2. An apparatus according to claim 1, wherein said unit reading optical systems are arrayed along a direction orthogonal to the movement direction of the original moved on said supporting means.

3. An apparatus according to claim 1, wherein said unit reading optical systems are disposed so as to read the original surface in a staggered fashion.

4. An apparatus according to claim 1, wherein said unit reading optical systems are disposed two-dimensionally.

5. An apparatus according to claim 2, 3 or 4, wherein said zone plates are disposed on one surface of a transparent substrate and said photosensor means are disposed on the other surface of said substrate.

6. An apparatus according to claim 1, further comprising means disposed between the original surface and at least one of said zone plates of said unit optical reading systems to intercept light beams directed from part areas of the original surface not corresponding to the one of said unit reading optical systems provided with said zone plate.

7. An apparatus according to claim 1, wherein said at least one predetermined order of diffracted light comprises the first-order diffraction light generated by said zone plates.

8. An apparatus according to claim 7, wherein said plurality of zone plates are rectilinearly disposed in a direction substantially orthogonal to the movement direction of the original.

9. An apparatus according to claim 7, wherein said plurality of zone plates are disposed so as to read the original surface in a stagger fashion.

10. An apparatus for reading an original surface, comprising:
    a transparent substrate,
    an array of zone plates formed on said transparent substrate;
    a plurality of photosensor means for reading respective portions of the original surface, each of said photosensor means being located at a position whereat diffraction light of at least one predetermined order from a corresponding one of said zone plates is condensed and focused to form an image of the corresponding portion of the original surface;
    means for defining a slit-like reading visual field on the original surface; and
    light intercepting means disposed generally between the original surface and said photosensor means to prevent entry into said photosensor means of light beams other than those from the corresponding portion of the original surface.

11. An apparatus for dividing an original surface into a plurality of areas and for reading each of the divided areas to thereby read the entire original surface, comprising:
    a transparent substrate;
    a plurality of zone plates formed on said transparent substrate, each of said zone plates condensing a light beam emerging from a corresponding one of the divided areas of the original surface;
    a photodetector substrate;
    a plurality of photodetector means formed on said photodetector substrate, each of said photodetector means being located at a position whereat diffracted light from a corresponding one of said zone plates is condensed and focused to form an image of the corresponding area of the original surface;
    light intercepting means formed in at least one of said substrates for excluding from said photodetector means light other than that from the corresponding one of the divided areas of the original surface; and
    means for defining a slit-like reading visual field on the original surface.

12. An apparatus according to claim 11, wherein said substrates for said zone plates and for said photodetector means are supported integrally.

* * * * *

UNITED STATES PATENT AND TRADEMARK OFFICE
CERTIFICATE OF CORRECTION

PATENT NO. : 4,539,482

DATED : September 3, 1985

INVENTOR(S) : NORIYUKI NOSE

It is certified that error appears in the above-identified patent and that said Letters Patent is hereby corrected as shown below:

Column 1, line 62, "reducedscale" should read --reduced-scale--.

Column 3, line 45, "adjrustment" should read --adjustment--.

Column 6, line 7, "manufacturin" should read --manufacturing--.

Column 11, line 1, "$109_1 109_4$" should read --$109_1$-$109_4$--.

Column 12, line 9, "0.8 time" should read --0.8-time--.

Column 13, line 6, "2mm 100 - 3mm100" should read --2 $\overset{\phi}{mm}$ - 3 $\overset{\phi}{mm}$--;

line 8, "20% 14 40%" should read -- 20% - 40%--;

line 33, delete "the" (first occurrence); delete "plane" (first occurrence).

Column 15, line 59, "slitlike" should read --slit-like--.

UNITED STATES PATENT AND TRADEMARK OFFICE
CERTIFICATE OF CORRECTION

PATENT NO. : 4,539,482

DATED : September 3, 1985

INVENTOR(S) : NORIYUKI NOSE

It is certified that error appears in the above-identified patent and that said Letters Patent is hereby corrected as shown below:

Column 21, line 42, "$232A_2$, $232A_1$" should read --$232A_1$, $232A_2$--.

Column 25, line 23, "stows" should read --shows--.

Column 28, line 13, Claim 9, "stagger" should read --staggered--.

Signed and Sealed this

Twenty-third Day of September 1986

[SEAL]

Attest:

DONALD J. QUIGG

Attesting Officer

Commissioner of Patents and Trademarks